(12) United States Patent
Takeda et al.

(10) Patent No.: US 11,343,309 B2
(45) Date of Patent: May 24, 2022

(54) SERVER LOAD PREDICTION SYSTEM AND SERVER LOAD PREDICTION METHOD

(71) Applicant: Hitachi, Ltd., Tokyo (JP)

(72) Inventors: Eriko Takeda, Tokyo (JP); Daisuke Ishii, Tokyo (JP); Takumi Oishi, Tokyo (JP); Kunihiko Toumura, Tokyo (JP); Riu Hirai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/186,326

(22) Filed: Feb. 26, 2021

(65) Prior Publication Data
US 2021/0306411 A1 Sep. 30, 2021

(30) Foreign Application Priority Data
Mar. 25, 2020 (JP) .............................. JP2020-054904

(51) Int. Cl.
*H04L 29/08* (2006.01)
*H04L 67/1012* (2022.01)
*G06F 17/18* (2006.01)
*H04L 67/1008* (2022.01)
*H04L 41/147* (2022.01)

(52) U.S. Cl.
CPC .......... *H04L 67/1012* (2013.01); *G06F 17/18* (2013.01); *H04L 67/1008* (2013.01); *H04L 41/147* (2013.01)

(58) Field of Classification Search
CPC . H04L 67/32; H04L 67/1002; H04L 67/1008; H04L 67/1012; H04L 67/101; H04L 43/08; H04L 67/2823; H04L 41/147; G06F 17/18
See application file for complete search history.

(56) References Cited

U.S. PATENT DOCUMENTS

| | | | | |
|---|---|---|---|---|
| 2007/0106796 | A1* | 5/2007 | Kudo | H04L 67/1002 709/226 |
| 2014/0055627 | A1* | 2/2014 | Fujii | H04L 67/32 348/207.1 |
| 2014/0313415 | A1* | 10/2014 | Yokomitsu | H04N 19/132 348/604 |
| 2019/0303210 | A1* | 10/2019 | Enami | G06F 9/505 |
| 2021/0208949 | A1* | 7/2021 | Bijwe | G06F 9/5044 |
| 2021/0279112 | A1* | 9/2021 | Janakiraman | G06F 9/5038 |

FOREIGN PATENT DOCUMENTS

JP 2019-135578 A 8/2019

* cited by examiner

*Primary Examiner* — Jungwon Chang
(74) *Attorney, Agent, or Firm* — Baker Botts L.L.P.

(57) ABSTRACT

Provided is a server load prediction system that predicts a server load on a server connected to an apparatus installed in a production process including an apparatus requirement specification storage unit that stores a requirement specification of each apparatus for a server, a server specification storage unit that stores a server specification indicating a capability held by each server, an input information creation unit that receives an input of a calculation condition and creates an input parameter required to execute a simulation for calculating the server load, a server load calculation unit that calculates the server load caused by the apparatus used in a process designated under the calculation condition by executing the simulation, and an output unit that outputs the calculation result.

15 Claims, 19 Drawing Sheets

| DATA ID | APPARATUS | SERVER LOAD INFORMATION ||| WORK INFORMATION ||||
|---|---|---|---|---|---|---|---|---|
| | | CALCULATION AMOUNT | MEMORY | STORAGE | WORK ID | WORKER ID | RELATED APPARATUS | ANALYSIS MODEL | ACQUISITION TIME |
| S1-A-t1 | APPARATUS A | A_c | A_m | A_s | A1-1 | 53 | CAMERA A | — | A_t1 |
| S1-Ca1-t1 | CAMERA A | CaA_c | CaA_m | CaA_s | CaA1-1 | — | APPARATUS A | m1 | CaA_t1 |
| S1-B-t1 | APPARATUS B | B_c | B_m | B_s | B1-1 | 32, 45 | CAMERA B | — | B_t1 |
| S1-Ca2-t1 | CAMERA B | CaB_c | CaB_m | CaB_s | CaB1-1 | — | APPARATUS B | m2 | CaB_t1 |
| S2-C-t1 | APPARATUS C | C_c | C_m | C_s | C1-1 | 68, 70, 105 | CAMERA C | — | C_t1 |
| S2-Ca3-t1 | CAMERA C | CaC_c | CaC_m | CaC_s | CaC1-1 | — | APPARATUS C | m3 | CaC_t1 |
| ... | ... | ... | ... | ... | ... | ... | ... | ... | ... |

FIG. 7

| SERVER | CALCULATION AMOUNT | MEMORY | STORAGE |
|---|---|---|---|
| SERVER A | ... | ... | ... |
| SERVER B | ... | ... | ... |
| ... | ... | ... | ... |

FIG. 9

| PROCESS | APPARATUS | WORK ID |
|---|---|---|
| PROCESS A | APPARATUS A | A1-1 |
| | CAMERA A | CaA1-1 |
| | APPARATUS B | B1-1 |
| | CAMERA B | CaB1-1 |
| | APPARATUS C | C1-1 |
| | CAMERA C | CaC1-1 |
| | ... | ... |
| PROCESS B | APPARATUS A | ... |
| | CAMERA A | ... |
| | APPARATUS B | ... |
| | CAMERA B1 | ... |
| | CAMERA B2 | ... |
| | APPARATUS C | ... |
| | ... | ... |
| ... | ... | ... |

● APPARATUS REQUIREMENT SPECIFICATION ← 651

| APPARATUS | CALCULATION AMOUNT | MEMORY | STORAGE |
|---|---|---|---|
| APPARATUS A | A_c | A_m | A_s |
| CAMERA A | CaA_c | CaA_m | CaA_s |
| APPARATUS B | B_c | B_m | B_s |
| CAMERA B | CaB_c | CaB_m | CaB_s |
| APPARATUS C | C_c | C_m | C_s |
| CAMERA C | CaC_c | CaC_m | CaC_s |
| ... | ... | ... | ... |

● SERVER SPECIFICATION ← 652

| SERVER | CALCULATION AMOUNT | MEMORY | STORAGE |
|---|---|---|---|
| SERVER A | SA_c | SA_m | SA_s |
| SERVER B | SB_c | SB_m | SB_s |
| ... | ... | ... | ... |

● CALCULATION METHOD NUMBER ← 653
NUMBER 1

● CONNECTION RELATIONSHIP ← 654
SERVER A – APPARATUS A, CAMERA A, APPARATUS D, CAMERA D
SERVER B – APPARATUS E, CAMERA E
...

FIG. 16

| CALCULATION ORDER | APPARATUS | OPERATION CHANGE CONTENT | OPERATION CONDITION |
|---|---|---|---|
| 1 | CAMERA A | CHANGE TRANSMISSION INTERVAL OF IMAGE TRANSMITTED TO SERVER FROM 100 ms TO 200 ms | REQUIREMENT SPECIFICATION ×0.5 |
| 2 | CAMERA A | CHANGE TRANSMISSION INTERVAL OF IMAGE TRANSMITTED TO SERVER FROM 100 ms TO 200 ms | REQUIREMENT SPECIFICATION ×0.5 |
| | CAMERA D | CHANGE TRANSMISSION INTERVAL OF IMAGE TRANSMITTED TO SERVER FROM 100 ms TO 200 ms | REQUIREMENT SPECIFICATION ×0.5 |
| 3 | CAMERA A | CHANGE TRANSMISSION INTERVAL OF IMAGE TRANSMITTED TO SERVER FROM 100 ms TO 500 ms | REQUIREMENT SPECIFICATION ×0.2 |
| | CAMERA D | CHANGE TRANSMISSION INTERVAL OF IMAGE TRANSMITTED TO SERVER FROM 100 ms TO 200 ms | REQUIREMENT SPECIFICATION ×0.5 |
| 4 | CAMERA A | CHANGE TRANSMISSION INTERVAL OF IMAGE TRANSMITTED TO SERVER FROM 100 ms TO 500 ms | REQUIREMENT SPECIFICATION ×0.2 |
| | CAMERA D | CHANGE TRANSMISSION INTERVAL OF IMAGE TRANSMITTED TO SERVER FROM 100 ms TO 200 ms | REQUIREMENT SPECIFICATION ×0.5 |
| | CAMERA E | CHANGE TRANSMISSION INTERVAL OF IMAGE TRANSMITTED TO SERVER FROM 100 ms TO 200 ms | REQUIREMENT SPECIFICATION ×0.5 |

SERVER LOAD PREDICTION SYSTEM AND SERVER LOAD PREDICTION METHOD

BACKGROUND OF THE INVENTION

1. Field of the Invention

The present invention relates to a server load prediction system and a server load prediction method, and is suitable for applying to the server load prediction system that predicts a load of a server connected to an apparatus in a production process and the server load prediction method.

2. Description of the Related Art

In recent years, with the development of a communication technology and an analysis technology, it is studied to acquire various information in the production process and quantify or visualize various events. In this case, in the production process, a device (an information acquisition device) for acquiring various information is installed, in addition to the production apparatus. For example, in the information acquisition device, an image captured by a camera is transmitted to a server wirelessly or by a wire, and an image analysis is executed by the server when the camera is installed for analyzing a movement of a worker in the production process. Therefore, the system including the above-described server needs to have a configuration suitable for the server load caused by the image analysis.

Here, as a background art of the present invention, JP 2019-135578 A discloses that in order to provide a cloud system, a cloud server, an edge server, and an user device, which are resistive against an environment change in operation, there is provided a cloud system including the cloud server, the edge server, and the user device, which can communicate with each other via a network. The cloud system includes a middleware that functions in a lower layer of a service operated by the cloud server, the edge server and the user device, and the middleware includes a monitoring function that monitors a state of the network and an operation state of each of the cloud server, the edge server and the user device, a switching function that dynamically switches a system configuration including a topology of the network based on a result of the monitoring, and a redistribution function that redistributes an operation place of the service according to the switching of the system configuration.

JP 2019-135578 A discloses that a middleware MW automatically switches the system configuration when a connection state of the network is changed (for example, when the device is at outdoors and moved to the place where the device cannot connect to the network) or when the operation state of the device is changed (for example, when a cloud device or an edge device is down).

SUMMARY OF THE INVENTION

However, as described above, when the information acquisition device (for example, a camera) is installed in the production process and the image analysis is executed by the server, the load generated in the server due to the image analysis is changed by a content of the image or an analysis model used for the analysis even in a case of the same data amount of the image as well as by the data amount of the image received by the server. Therefore, when the number of the production apparatuses to be used or the number of the cameras to be installed is changed due to the change of the production process, the load of the server is also changed. The load of the server is also changed when the number of production apparatuses or the number of the servers to be installed is changed.

Therefore, in order to prevent the load of the server from exceeding a permissible range, it is desirable to be able to predict the load of the server in advance before making a change in the production process and consider a system configuration suitable for the predicted load of the server.

However, JP 2019-135578 A discloses that the operation state is monitored and the system configuration is changed based on the monitoring result, but does not disclose that the operation state is predicted in advance and the system configuration is proposed based on the prediction result at all. Therefore, in the technology disclosed in JP 2019-135578 A, after making the change in the production process, the system configuration can only be changed after the actual operation state is monitored, and there is a risk that the image analysis is not capable of being performed when the change of the system configuration causes an overload of the server.

The present invention has been made in consideration of the above perspectives, and is to provide a server load prediction system capable of predicting a load of a server connected to an apparatus in a production process and a server load prediction method.

In order to solve such a problem, there is provided a server load prediction system that predicts a server load on one or more servers connected to one or more apparatuses installed in a production process. The server load prediction system includes: an apparatus requirement specification storage unit that stores an apparatus requirement specification regarding each apparatus of the one or more apparatuses, the apparatus requirement specification including a server load information indicating a load applied to the server of a connection destination for a control of the apparatus or processing of information transmitted from the apparatus and work information indicating information on a work using the apparatus; a server specification storage unit that stores a server specification indicating a capability held by each server of the one or more servers; an input information creation unit that receives an input of a calculation condition including a designation of a process of predicting the server load, and creates an input parameter required to execute a simulation for calculating the server load based on the calculation condition, the apparatus requirement specification and the server specification; a server load calculation unit that calculates the server load applied to the server of the connection destination, which is caused by the apparatus used in the process designated under the calculation condition, by executing the simulation based on the input parameter; and an output unit that outputs a calculation result obtained by the server load calculation unit.

In order to solve such a problem, there is provided a server load prediction method by a system that predicts a server load on one or more servers connected to one or more apparatuses installed in a production process. In the system, an apparatus requirement specification regarding each apparatus of the one or more apparatuses is stored, the apparatus requirement specification including a server load information indicating a load applied to the server of a connection destination for a control of the apparatus or processing of information transmitted from the apparatus and work information indicating information on a work using the apparatus, and a server specification indicating a capability held by each server of the one or more servers is stored. The server load prediction method includes receiving an input of a calculation condition including a designation of a process of predicting the server load, and creating an input parameter required to execute a simulation for calculating the server load based on the calculation condition, the apparatus requirement specification and the server specification; calculating the server load applied to the server of the connection destination, which is caused by the apparatus used in the process designated under the calculation condition, by executing the simulation based on the input parameter; and outputting a calculation result obtained by the calculating of the server load.

According to the present invention, it is possible to predict the load of the server connected to the apparatus in the production process.

Problems, configurations, and effects other than those described above will be clarified by the following description of the embodiments.

BRIEF DESCRIPTION OF THE DRAWINGS

FIG. 6 is a diagram illustrating an example of an apparatus requirement specification table;

FIG. 7 is a diagram illustrating an example of a server specification table;

FIG. 9 is a diagram illustrating an example of a process-apparatus conversion table;

FIG. 10 is a diagram illustrating an example of an input parameter;

FIG. 16 is a table illustrating an example of an operation change list;

DESCRIPTION OF THE PREFERRED EMBODIMENTS

Figure 1:
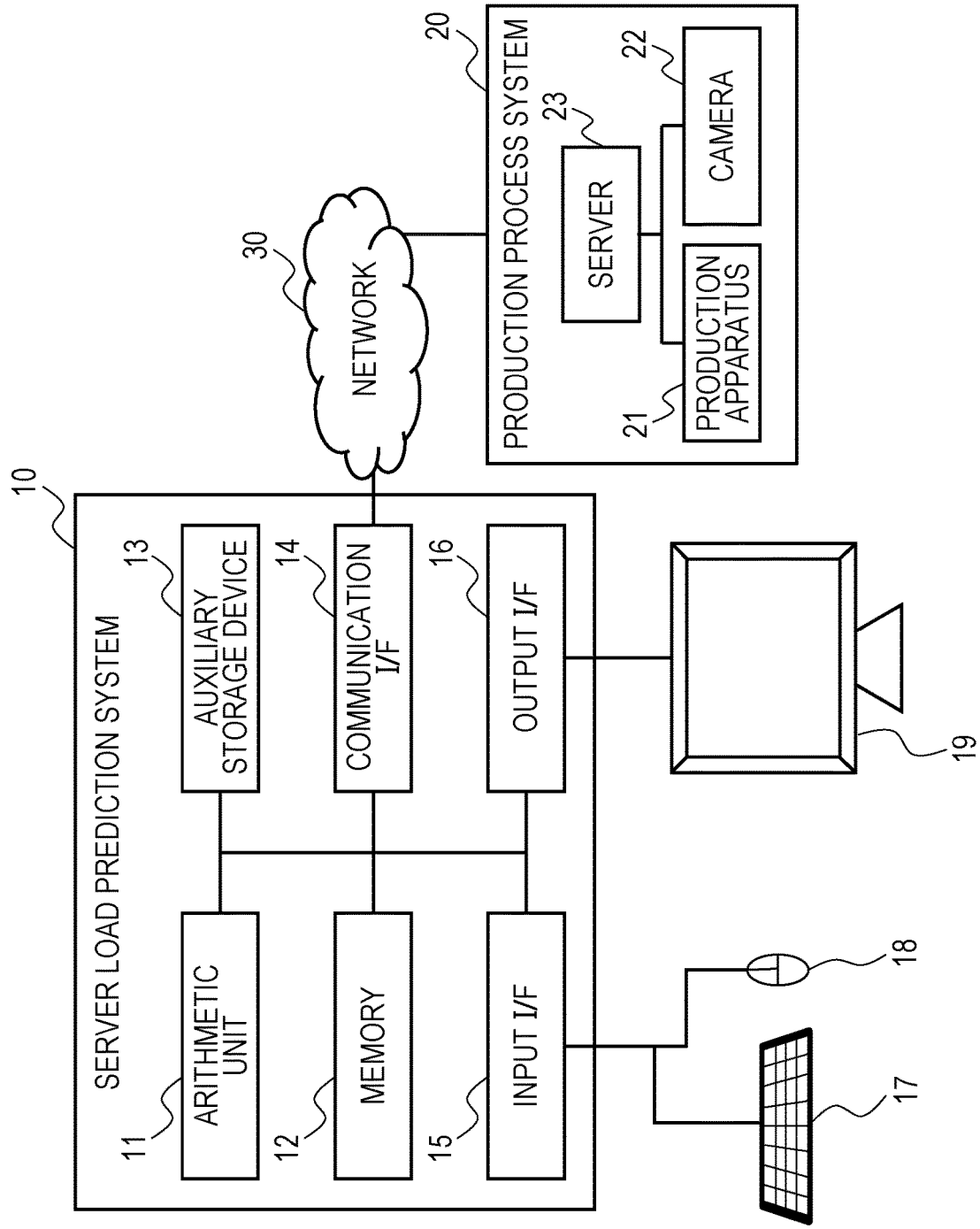
FIG. 1 is a block diagram illustrating a hardware configuration example of a server load prediction system according to a first embodiment.

Preferred embodiments of the present invention will be described in detail below with reference to the accompanying drawings, wherein like reference numerals refer to like parts throughout.

In the following embodiments, the description will be divided into a plurality of sections or embodiments when it is necessary for convenience, but unless otherwise specified, they are related to each other, and one has relations with all or a part of the modification examples, details and supplementary explanations of the other. Each embodiment may be implemented individually or in combination thereof.

in the following embodiments, when referring to the number of elements (including the number, numerical value, quantity, range, and the like), except when explicitly stated or when the number is clearly limited to a specific number in principle, it is not limited to the specific number, and may be more than the specific number, or less than the specific number.

In the following embodiments, it goes without saying that the components (including element steps, and the like) in the embodiments are not necessarily essential unless otherwise specified or clearly considered to be essential in principle.

Similarly, in the following embodiments, when referring to a shape or positional relationship of the components, unless otherwise specified or clearly considered to be essential in principle, the components include components substantially approximating or similar to the shape of the components. This also applies to numerical values and a range.

In the following description, information, which can be output when input is made, may be described by an expression such as "xxx table", but the information may be data having any structure. In the following description, a configuration of each table is an example, and one table may be divided into two or more tables, or all or a part of two or more tables may be one table. In the following description, the function may be described by an expression of "xxx unit", but the function may be realized by executing one or more computer programs.

In the following embodiment, a case in which a general wireless LAN device is used as a part of components of the system and at least a part of the communication required for the system is performed wirelessly, will be described. In the following embodiments, wireless components other than the wireless LAN may be used as a part of the components of the system.

1. First Embodiment 1-1 Configuration

FIG. 1 is a block diagram illustrating a hardware configuration example of a server load prediction system 10 according to a first embodiment. As shown in FIG. 1, a server load prediction system 10 is a computer system including an arithmetic unit 11, a memory 12, an auxiliary storage device 13, a communication interface 14, an input interface 15, and an output interface 16, and various functions of the server load prediction system 10 are implemented by the arithmetic unit 11 executing various programs.

The arithmetic unit 11 is an arithmetic device that executes a program stored in the memory 12. A part of processing performed by the arithmetic unit 11 executing a program may be performed by another arithmetic device (for example, a field programmable gate array (FPGA)).

The memory 12 includes a read-only memory (ROM) which is a non-volatile storage element, and a random access memory (RAM) which is a volatile storage element. The ROM stores an immutable program (for example, BIOS). The RAM is a high-speed and volatile storage element such as a dynamic random access memory (DRAM), and temporarily stores a program executed by the arithmetic unit 11 and data used when the program is executed.

The auxiliary storage device 13 is a large-capacity and non-volatile storage device such as a magnetic storage device (a hard disk drive (HDD)) or a flash memory (a solid state drive (SSD)). The auxiliary storage device 13 stores data used by the arithmetic unit 11 when the program is executed and the program executed by the arithmetic unit 11. That is, the program is read from the auxiliary storage device 13, loaded into the memory 12, and executed by the arithmetic unit 11 to implement each function of the server load prediction system 10.

The communication interface 14 is a network interface device that controls a communication with other devices according to a predetermined protocol. For example, as shown in FIG. 1, the communication interface 14 controls a communication with the production process system 20 connected via the network 30.

The input interface 15 is an interface to which an input device such as a keyboard 17 or a mouse 18 is connected. When a user operates the input device, the input interface 15 receives an input from the user via the input device.

The output interface 16 is an interface to which an output device such as a display device 19 or a printer (not shown) is connected. The output interface 16 outputs, for example, an execution result of a simulation program for calculating the load of the server to the output device in a format that can be visually recognized by the user.

The simulation program executed by the arithmetic unit 11 is provided to the server load prediction system 10 via removable media (a CD-ROM, a flash memory, and the like) or the network 30, and is stored in the auxiliary storage device 13 which is non-volatile and a non-temporary storage medium. Therefore, the server load prediction system 10 may include an interface for reading data from the removable media.

The server load prediction system 10 is not limited to being physically configured as one computer as shown in FIG. 1, for example, the server load prediction system 10 may be a computer system configured as a plurality of logically or physically configured computers, and may be operated on a virtual computer constructed under a plurality of physical computers.

As shown in FIG. 1, the server load prediction system 10 is connected to the production process system 20 in operation via the network 30, and with such a configuration, information on an apparatus requirement specification (details thereof will be described later) can be collected from the production process system 20 in operation.

The production process system 20 is a system constructed in the production process, and is configured by connecting one or more production apparatuses 21 and one or more cameras 22 to one or more servers 23 via a wireless or wired network.

Figure 2:
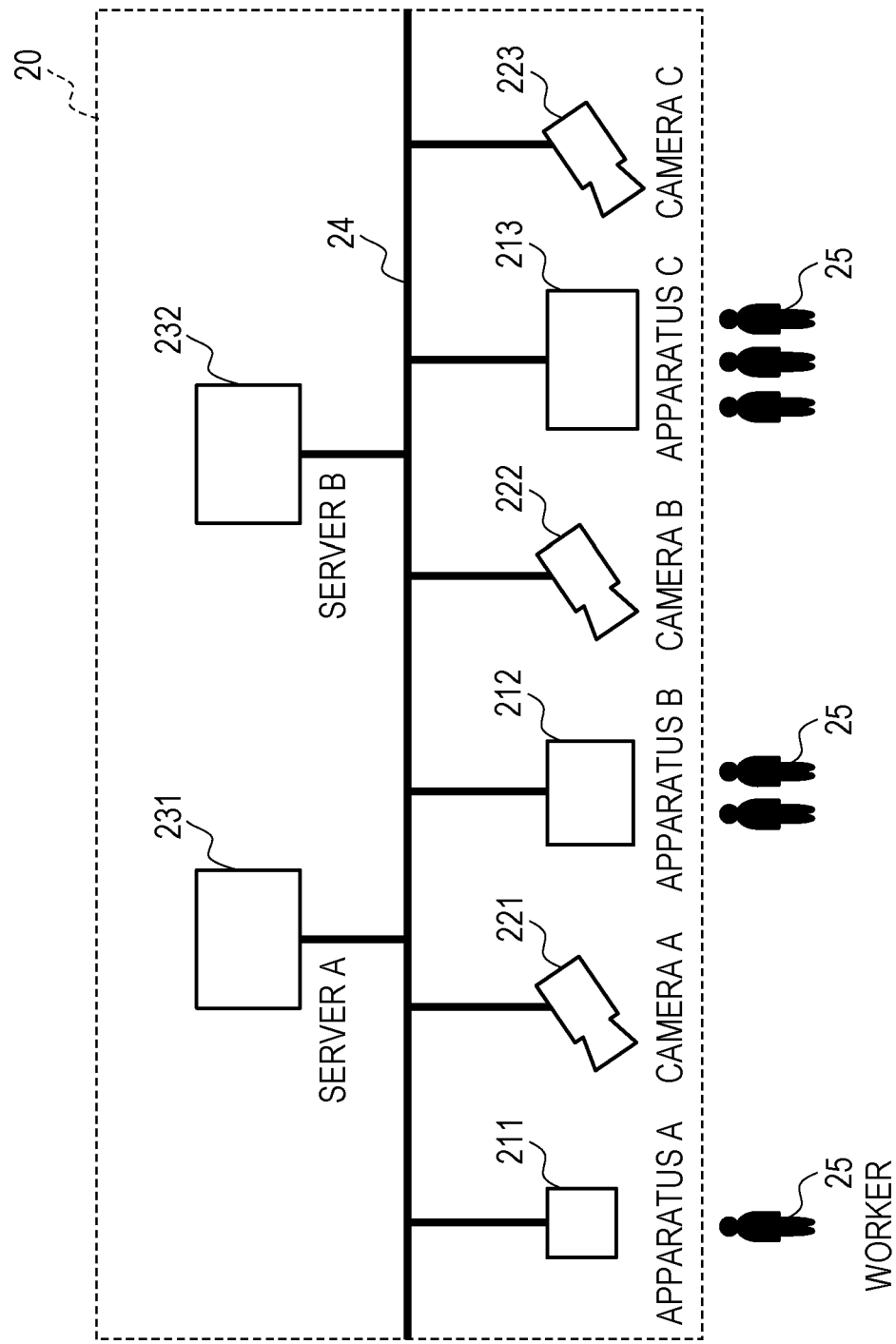
FIG. 2 is a block diagram illustrating a configuration example of a production process system in operation.

FIG. 2 is a block diagram illustrating a configuration example of a production process system 20 in operation. The production process system 20 shown in FIG. 2 is configured by connecting production apparatuses 211 to 213 (corresponding to the production apparatus 21 in FIG. 1), cameras 221 to 223 (corresponding to the camera 22 in FIG. 1), and servers 231 and 232 (corresponding to the server 23 in FIG. 1) via a wired network 24.

The production apparatus 21 (the production apparatuses 211 to 213) is an apparatus for performing a predetermined production work in the production process. Respectively, the production apparatus 211 corresponds to an apparatus A, the production apparatus 212 corresponds to an apparatus B, and the production apparatus 213 corresponds to an apparatus C.

The camera 22 (the cameras 221 to 223) is an example of an information acquisition device that acquires various information in the production process, and photographs a motion of a worker 25 using the production apparatus 21. Respectively, the camera 221 (the camera A) photographs the motion of the worker 25 using the apparatus A, the camera 222 (the camera B) photographs the motion of the worker 25 using the apparatus B, and the camera 223 (the camera C) photographs the motion of the worker 25 using the apparatus C.

The server 23 (the servers 231 and 232) is a server that acquires information from the production apparatus 21 and the camera 22, and executes processing such as an image analysis. Respectively, the server 231 corresponds to a server A, and the server 232 corresponds to a server B. Since the above-mentioned production apparatus 21 and camera 22 are devices connected to the server 23 in the production process, they are collectively referred to as an "apparatus", an "apparatus in the production process" or an "apparatus used in the production process" in the following description.

In FIG. 1, the server load prediction system 10 is illustrated as a configuration independent of the production process system 20, but as one form in the present invention, the server load prediction system 10 may be configured to be operated in the server 231 or the server 232 of the production process system 20 shown in FIG. 2.

Figure 3:
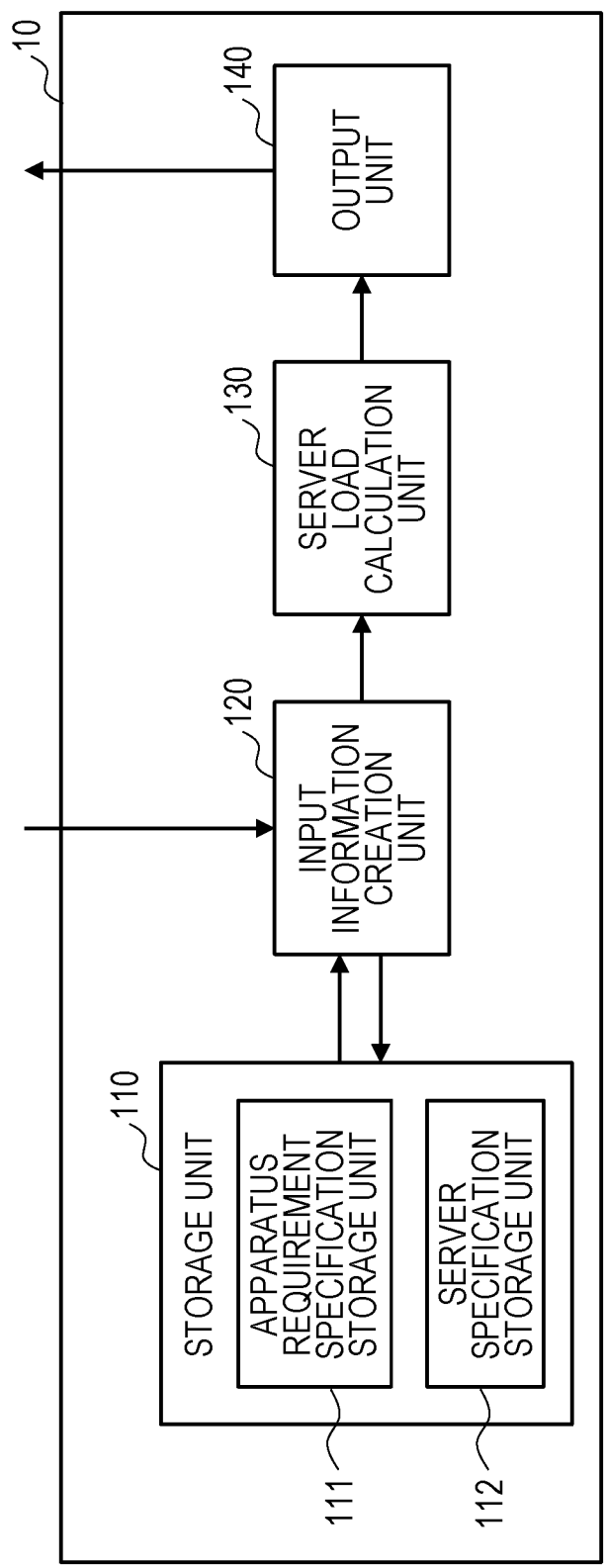
FIG. 3 is a block diagram illustrating a function configuration example of a server load prediction system.

FIG. 3 is a block diagram illustrating a function configuration example of the server load prediction system 10. As described above with reference to FIGS. 1 and 2, the server load prediction system 10 is a computer system that predicts a load of the server 23 in the production process system 20. As shown in FIG. 3, the server load prediction system 10 includes a storage unit 110, an input information creation unit 120, a server load calculation unit 130, and an output unit 140 as a function configuration.

The storage unit 110 includes an apparatus requirement specification storage unit 111 and a server specification storage unit 112 that stores a value related to a capability held by the server as a specification of the server (a server specification).

The apparatus requirement specification storage unit 111 stores data indicating a requirement specification of the apparatus for the server 23 (an apparatus requirement specification). The apparatus requirement specification is represented by a value related to a control of the apparatus in the production process or a value related to a capability of the server 23 required to process information output by the apparatus. In FIG. 6 which will be described later, an apparatus requirement specification table 610 is shown as an example of data of the apparatus requirement specification stored in the apparatus requirement specification storage unit 111.

The server specification storage unit 112 stores data indicating a specification of the server 23 (a server specification). The server specification is represented by a value related to the capability held by the server 23. In FIG. 7 which will be described later, a server specification table 620 is shown as an example of data of the server specification stored in the server specification storage unit 112.

For the purpose of a data collection, the "apparatus requirement specification" stored in the server load prediction system according to the present invention may be measured and collected by operating the apparatus in the production process one by one, or may be collected from each apparatus when the apparatus is actually operated in the production process. The requirement specification may be continuously measured when the apparatus is operated in the production process, and the data may be updated as necessary. Past information may be held until a predetermined period elapses.

The above-mentioned "apparatus requirement specification" may be calculated by calculating the requirement specification under certain conditions based on the requirement specification under the other conditions. Specifically, for example, a requirement specification required for image processing of the camera 22 varies depending on an analysis model of an image, but may also vary depending on the number of people in the image. In this case, if a change in the requirement specification relative to a change in the number of the people in the image is already known when the same analysis model is used, the apparatus requirement specification may be calculated by calculating the requirement specification in a case of a plurality of people based on the requirement specification in a case of one person.

The input information creation unit 120 has a function of creating an input parameter required for a server load calculation by the server load calculation unit 130 and outputting the created input parameter to the server load calculation unit 130.

Figure 4:
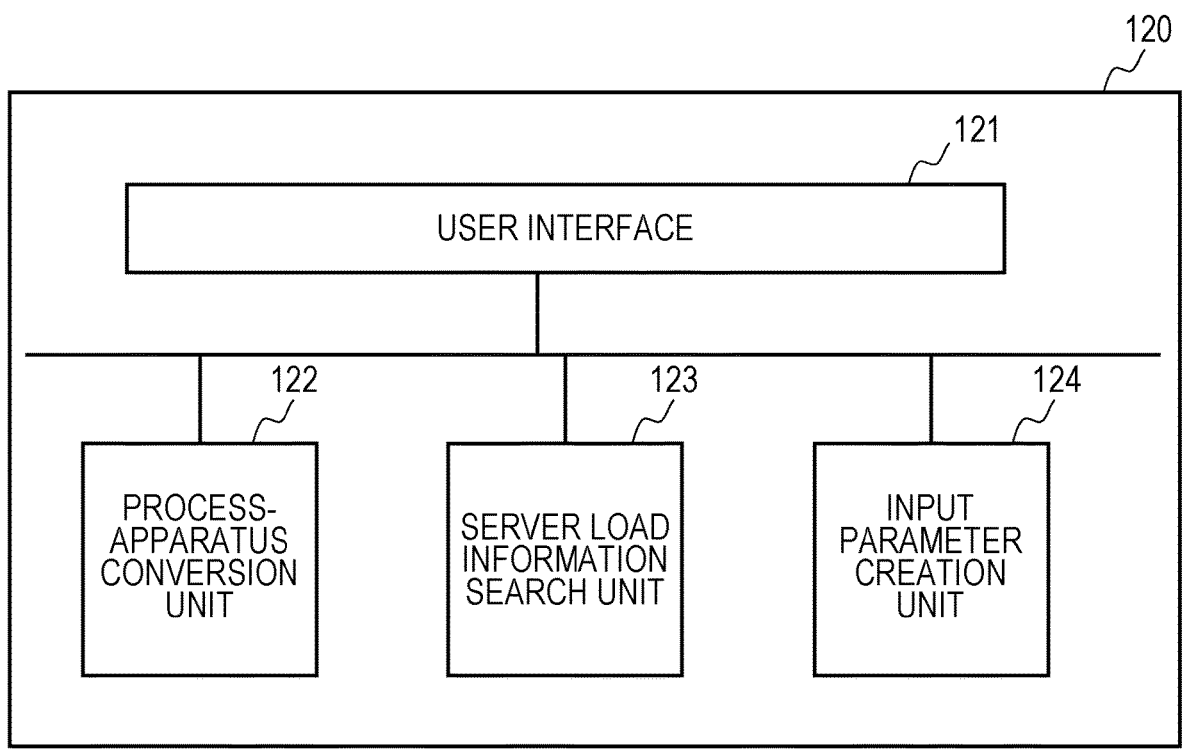
FIG. 4 is a block diagram illustrating an internal configuration example of an input information creation unit.

FIG. 4 is a block diagram illustrating an internal configuration example of an input information creation unit 120. As shown in FIG. 4, the input information creation unit 120 includes a user interface 121, a process-apparatus conversion unit 122, a server load information search unit 123, and an input parameter creation unit 124. A specific role of each unit configuring the input information creation unit 120 will be described in detail in the description of processes of the server load prediction in FIG. 11.

The server load calculation unit 130 has a function of calculating the load of the server. The details of the server load calculation unit 130 will be described later with reference to FIGS. 5 and 12.

Figure 5:
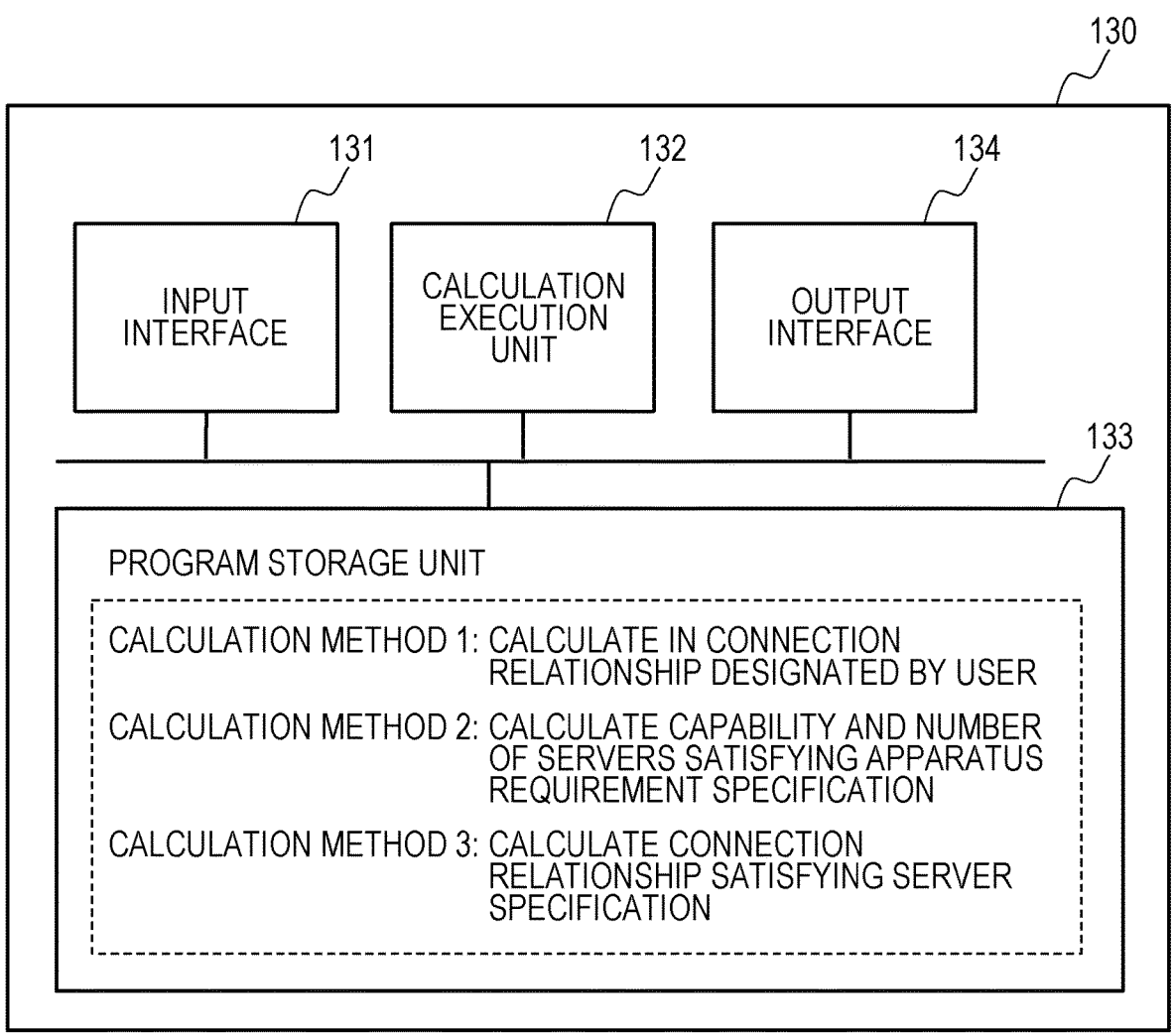
FIG. 5 is a block diagram illustrating an internal configuration example of a server load calculation unit.

FIG. 5 is a block diagram illustrating an internal configuration example of the server load calculation unit 130. As shown in FIG. 5, the server load calculation unit 130 includes an input interface 131, a calculation execution unit 132, a program storage unit 133, and an output interface 134. A specific role of each unit configuring the server load calculation unit 130 will be described in detail in the description of processes of the server load prediction in FIG. 11.

Figure 13:
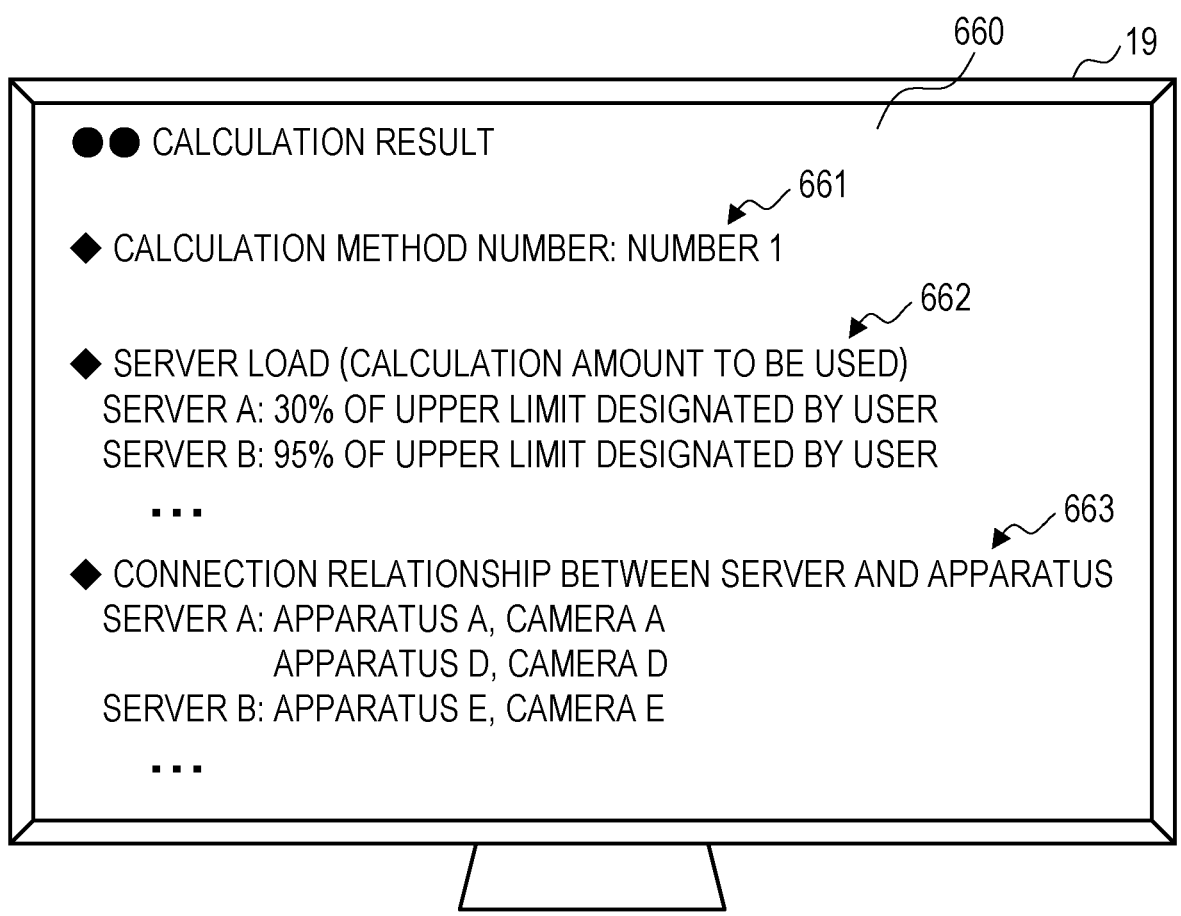
FIG. 13 is a diagram illustrating an example of a screen displaying a simulation result.

The output unit 140 has a function of outputting the calculation result by the server load calculation unit 130. FIG. 13, which will be described later, illustrates an example of a screen on which the calculation result is output by the output unit 140.

1-2 Data

In the following, data used in the server load prediction system 10 will be described with reference to the drawings. A method of using each data will be described in detail in the explanation of processes of the server load prediction in FIG. 11.

FIG. 6 is a diagram illustrating an example of an apparatus requirement specification table 610. The apparatus requirement specification table 610 is an example of the apparatus requirement specification stored in the apparatus requirement specification storage unit 111, and is data for managing the apparatus requirement specification for the server 23, which is used in the production process.

In FIG. 6, the apparatus requirement specification table 610 includes data items of a data ID 611, an apparatus 612, a server load information 613, and a work information 614. The server load information 613 includes sub-items of a calculation amount 6131, a memory 6132, and a storage 6133, and the work information 614 includes a work ID 6141, a worker ID 6142, a related apparatus 6143, an analysis model 6144, and an acquisition time 6145.

The data ID 611 is an identifier of the apparatus requirement specification. The data ID 611 may be assigned by the user or automatically assigned by the system.

The apparatus 612 is an apparatus used in the production process. The "apparatus" described in the apparatus 612 includes not only an apparatus such as a drilling machine which are directly used for producing products (for example, the production apparatus 21), but also a device such as a camera and a sensor which are not directly used for producing products (for example, the camera 22).

The server load information 613 is information indicating a resource required for the server 23 to operate the apparatus 612. In FIG. 6, as an example, the server load information 613 includes the calculation amount 6131, the memory 6132, and the storage 6133, which are required for the operation.

The work information 614 includes information related to a work performed by the apparatus 612 as various information which is a factor affecting the load of the server 23 (the server load information 613).

Specifically, since the server load information 613 may be changed depending on the work performed in the production process and the worker 25 who performs the work, the work information 614 in FIG. 6 includes the work ID 6141 which is an identifier representing the work and the worker ID 6142, which is an identifier representing the worker.

Since the related apparatus that is operated in cooperation with the apparatus 612 corresponding to the server load information 613 may also affect the server load information 613, the related apparatus 6143 in the work information 614 of FIG. 6 includes information of the related apparatus when the related apparatus exists.

Since the analysis model information used for analyzing information may also affect the server load information 613, the analysis model 6144 in the work information 614 of FIG. 6 includes information indicating the analysis model. To give further details, for example, the "analysis model" corresponds to an analysis model used for extracting the worker 25 from images acquired by the camera A, the camera B and the camera C in the production process to analyze the motion of the worker 25. In the case of such an analysis model for image analysis, assuming that information of the images input to the server 23 from each camera 22 has the same data amount, when kinds of the analysis models to be used are changed, at least one of a necessary calculation amount, memory or storage is changed. According to the analysis model, the server load may be changed depending on the number of the workers 25 in the image. That is, the analysis model may affect the server load information 613.

In consideration of a case where the load of the server varies with time and a case where a comparison between old information and new information is performed, the acquisition time 6145 in the work information 614 of FIG. 6 includes a time when the information is acquired.

Regarding the apparatus requirement specification table 610, the configuration of the data shown in FIG. 6 is only an example, and the apparatus requirement specification table 610 according to the present embodiment may include other data items. Specifically, for example, the server load information 613 may include information on a parameter having the largest influence on the server load (for example, only the calculation amount 6131 when the calculation amount has the largest influence), or may include information on a resource which is not illustrated in FIG. 6. For example, the work information 614 may include only an item having the largest influence on the server load, or may include an item which is not illustrated in FIG. 6.

A value of each item in the apparatus requirement specification table 610 can be recorded or updated at any time. For example, the server load information 613 and the acquisition time 6145 may be acquired from the server 23 of the production process system 20 in operation. For example, when a management device is separately provided which manages information on the work (the work ID 6141), the worker (the worker ID 6142), the related apparatus 6143 and the analysis model 6144, the information on the work (the work ID 6141), the worker (the worker ID 6142), the related apparatus 6143 and the analysis model 6144 may be acquired from the management device. For example, the user of the server load prediction system 10 may operate an input device such as a keyboard 17 or a mouse 18 to input necessary information such that a value in the apparatus requirement specification table 610 is recorded or updated.

FIG. 7 is a diagram illustrating an example of the server specification table 620. The server specification table 620 is an example of the server specification stored in the server specification storage unit 112, and is data for managing information on the capability held by the server 23.

The server specification table 620 is a table indicating a catalog value of performance of the server 23 which is to be used or has a possibility to be used in the production process. The server specification table 620, for another example, is a table, showing a value of an upper limit set by the user based on a value obtained by a measurement when the server 23 is used. Specifically, in FIG. 7, the server specification table 620 includes data items of a server 621, a calculation amount 622, a memory 623, and a storage 624.

Each value in the server specification table 620 may be set in advance, and the user may input a value every time in consideration of the production process when the server load prediction system 10 is used. The data items included in the server specification table 620 are not limited to an example shown in FIG. 7. For example, another data item which is not illustrated in FIG. 7 may be included in the server specification table 620, and one item which is dominant item in the requirement of apparatus may be include in the server specification table 620.

Figure 8:
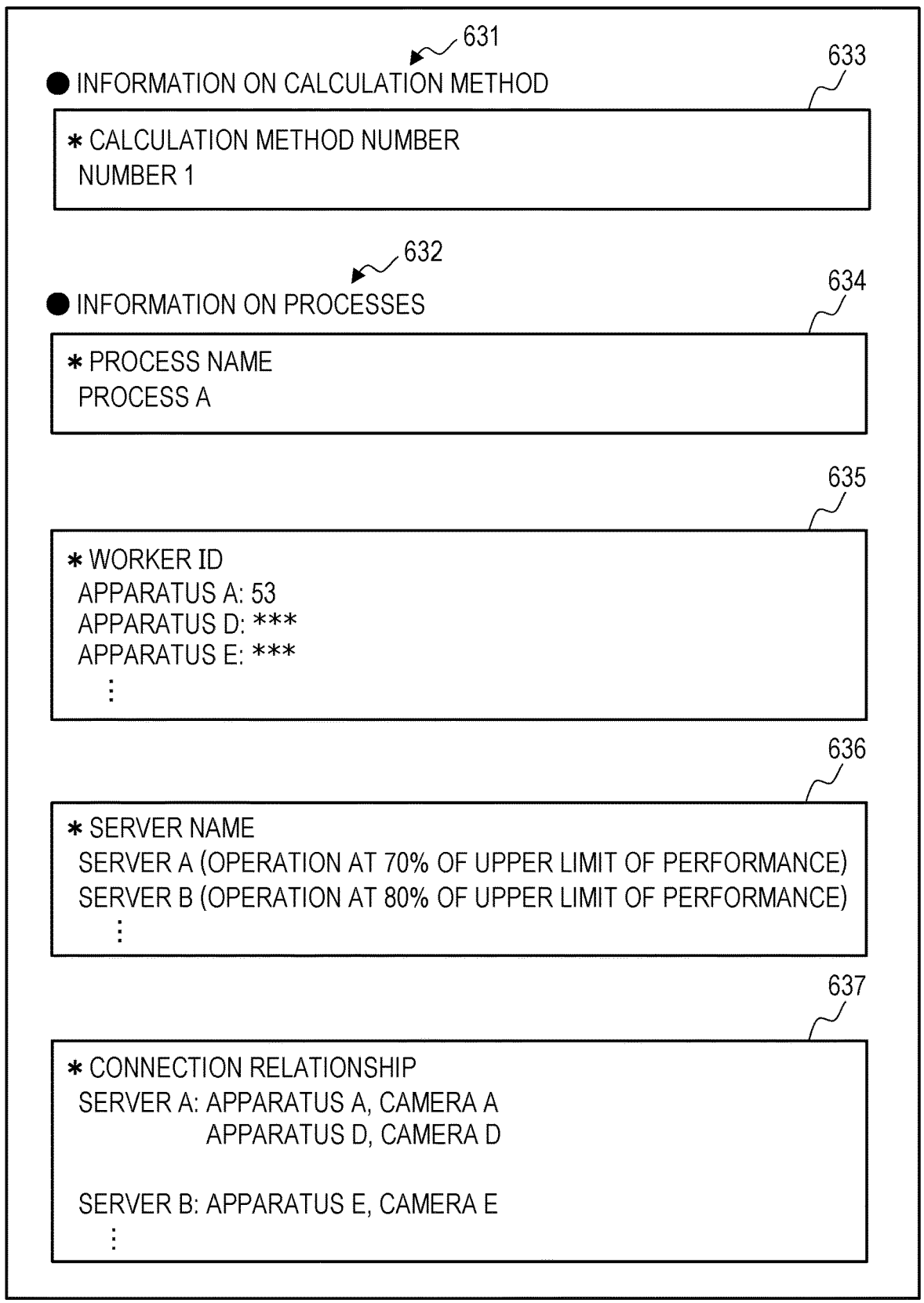
FIG. 8 is a diagram illustrating an example of a calculation condition.

FIG. 8 is a diagram illustrating an example of a calculation condition 630. The calculation condition 630 is information that designates a condition when the server load prediction system 10 predicts the server load, and may be roughly divided into information on calculation method 631 and information on processes 632. In the calculation condition 630, a content desired by the user is input by the user by performing an input operation on the user interface 121 of the input information creation unit 120.

As shown in FIG. 8, a calculation method number 633 indicating number of the calculation method used for predicting the server load is input to the information on calculation method 631. In the present embodiment, for example, as the calculation method used for predicting a server load, three kinds of calculation methods, calculation methods 1 to 3 are provided, which are indicated in the program storage unit 133 of FIG. 5, and the simulation program corresponding to each calculation method is stored in the program storage unit 133. Numbers 1 to 3 are assigned as the calculation method number corresponding to the calculation methods 1 to 3. That is, a program of Number 1, a program of Number 2, and a program of Number 3 are stored in the program storage unit 133. A feature of each calculation method will be described in server load calculation processing which will be described later.

As shown in FIG. 8, a process name 634 indicating a name of a process in which a server load is predicted, a worker ID 635 as information on a worker in charge of each apparatus (for example, the worker 25 operating a production apparatus 21), a server name 636 as information on the server 23 scheduled to be used, and a connection relationship 637 indicating a relationship between each sever 23 and an apparatus on which the server 23 performs a control or an analysis of information are input to the information on processes 632.

Not only the name of the server 23 scheduled to be used but also a server capability allowed for the server 23 during operation may be designated in the server name 636. Specifically, for example, when an "operation at 70% of the upper limit of performance" is designated, it is designated that the server capability held by the server 23 (for example, the calculation amount) may be used up to 70% of the capability of the server 23 during operation.

FIG. 9 is a diagram illustrating an example of a process-apparatus conversion table 640. The process-apparatus conversion table 640 is information indicating a correspondence relationship between each process in the production process and an apparatus used in each process, and includes data items of a process 641 indicating each process, an apparatus 642 indicating an apparatus used in the process 641, and a work ID 643 indicating an identifier of the work performed by using the apparatus 642 in the process 641. The process-apparatus conversion table 640 is stored in advance in a storage unit (not shown) in the process-apparatus conversion unit 122.

FIG. 10 is a diagram illustrating an example of an input parameter 650. The input parameter 650 is a parameter required for the server load calculation unit 130 to calculate the server load, and is created by the input parameter creation unit 124 in the server load prediction processing executed by the server load prediction system 10.

As shown in FIG. 10, the input parameter 650 includes an apparatus requirement specification 651, a server specification 652, a calculation method number 653, and a connection relationship 654. Of these, since the apparatus requirement specification 651 is configured according to the apparatus 612 of the apparatus requirement specification table 610 and the server load information 613, and the server specification 652 is configured according to the server specification table 620, an explanation for each of these is omitted. The calculation method number 653 corresponds to the calculation method number 633 of the calculation condition 630, and the connection relationship 654 corresponds to a connection relationship 637 of the calculation condition 630.

1-3 Processing

The server load prediction processing executed by the server load prediction system 10 will be described in detail below. The server load prediction processing is processing of predicting a server load under conditions designated by the user with respect to the server 23 connected to apparatuses (a production apparatus 21 and a camera 22) in the production process in the production process system 20.

Figure 11:
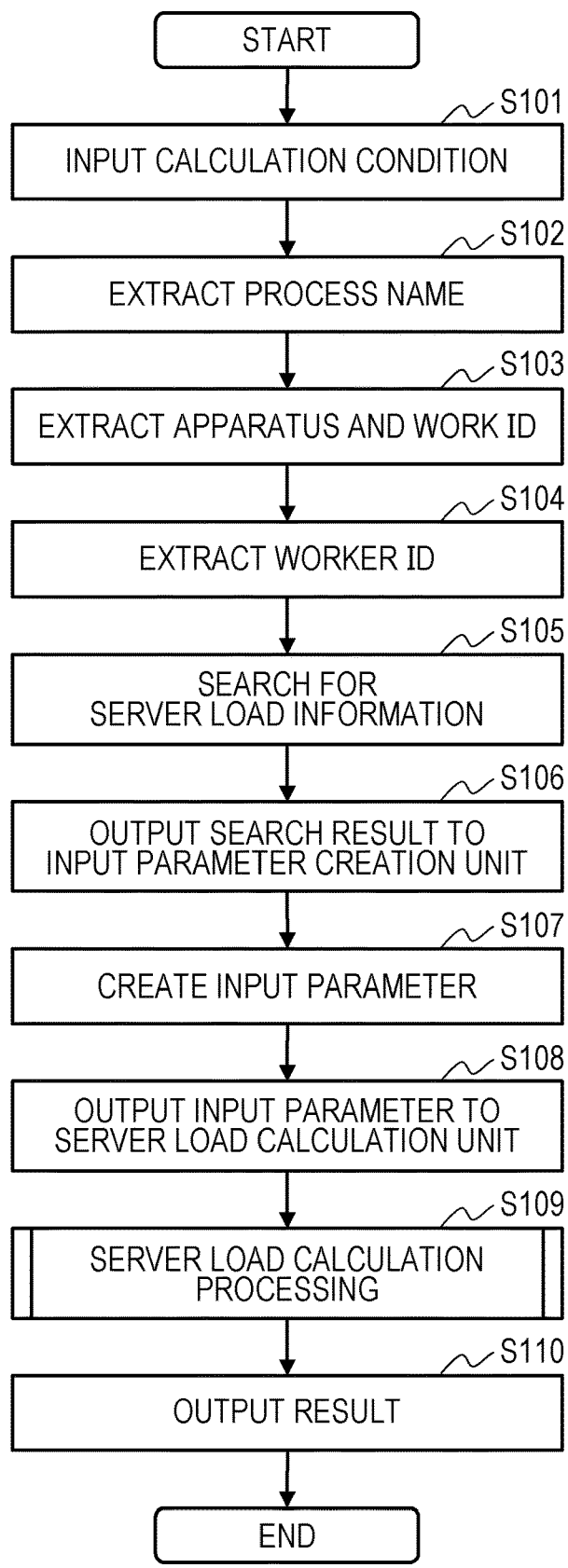
FIG. 11 is a flowchart illustrating an example of a processing procedure of server load prediction processing according to the first embodiment.

FIG. 11 is a flowchart illustrating an example of a processing procedure of server load prediction processing according to the first embodiment. In the processing procedures shown in FIG. 11, the processing in steps S101 to S108 is mainly executed by the input information creation unit 120, the processing in step S109 is executed by the server load calculation unit 130, and the processing in step S110 is mainly executed by the output unit 140.

According to FIG. 11, first, when the user inputs a calculation condition to the user interface 121 of the input information creation unit 120, the calculation condition 630 is input to the input information creation unit 120 (Step S101).

Next, the process-apparatus conversion unit 122 extracts the process name 634 from the calculation condition 630 input in step S101 (Step S102), and then extracts the apparatus 642 and the work ID 643 used in the process 641 corresponding to the process name 634 extracted in step S102 with reference to the process-apparatus conversion table 640 (Step S103).

Next, the process-apparatus conversion unit 122 extracts the worker ID 635 operating each apparatus 642 extracted in step S103 from the calculation condition 630 input in step S101 (Step S104). The process-apparatus conversion unit 122 outputs information on the apparatus, the work ID, and the worker ID extracted in steps S102 to S103 to the server load information search unit 123.

Next, the server load information search unit 123 searches the server load information 613 from the apparatus requirement specification table 610 stored in the apparatus requirement specification storage unit 111 by using the apparatus, the work ID and the worker ID input from the process-apparatus conversion unit 122 (Step S105). The server load information search unit 123 outputs the server load information 613 of each apparatus which is the search result of step S105 to the input parameter creation unit 124 as a requirement specification of each apparatus (an apparatus requirement specification) (Step S106).

In the present embodiment, when the process-apparatus conversion table 640 does not include the process 641 corresponding to the process name 634 extracted from the calculation condition 630 in step S102 in step S103 or when the apparatus requirement specification table 610 does not include a combination of the work ID 6141 and the worker ID 6142 corresponding to a combination of the work ID and the worker ID input from the process-apparatus conversion unit 122 in step S105, a message informing the user of "not applicable" may be displayed and the user may be prompted to input the server load information. Alternatively, the process-apparatus conversion unit 122 or the server load information search unit 123 may be configured to search for information under similar conditions and propose the information.

Next, the input parameter creation unit 124 creates the input parameter 650 based on the apparatus requirement specification input from the server load information search unit 123 in step S106 and the calculation condition 630 input to the input information creation unit 120 in step S101 (Step S107).

Here, an additional explanation of a specific method in which the input parameter creation unit 124 creates the input parameter 650 is provided. As shown in FIG. 10, the input parameter 650 includes an apparatus requirement specification 651, a server specification 652, a calculation method number 653, and a connection relationship 654. In step S107, the above-described information configuring the input parameter 650 is created as follows.

The apparatus requirement specification 651 is created by using the apparatus requirement specification input from the server load information search unit 123. The server specification 652 is created based on the server name 636 included in the calculation condition 630 by extracting the corresponding server specification (for example, the calculation amount 622, the memory 623 and the storage 624) from the server specification table 620 stored in the server specification storage unit 112. The calculation method number 653 is created by using the calculation method number 633 included in the calculation condition 630. The connection relationship 654 is created by using the connection relationship 637 included in the calculation condition 630.

Next, the input parameter creation unit 124 outputs the input parameter 650 created in step S107 to the server load calculation unit 130 (Step S108).

Next, the server load calculation unit 130 executes processing of calculating a server load (server load calculation processing) based on the input parameter 650 input in step S108 (Step S109). Details thereof will be described later with reference to FIG. 12. In the server load calculation processing, a simulation for calculating a server load is executed based on the input parameter 650, and the calculation result of the simulation is output to the output unit 140.

Finally, the output unit 140 outputs the calculation result of the simulation to the outside (Step S110), and ends the server load prediction processing. In step S109, the output unit 140 may output not only the calculation result of the simulation but also other information related to the simulation (see FIG. 13 which will be described later).

Figure 12:
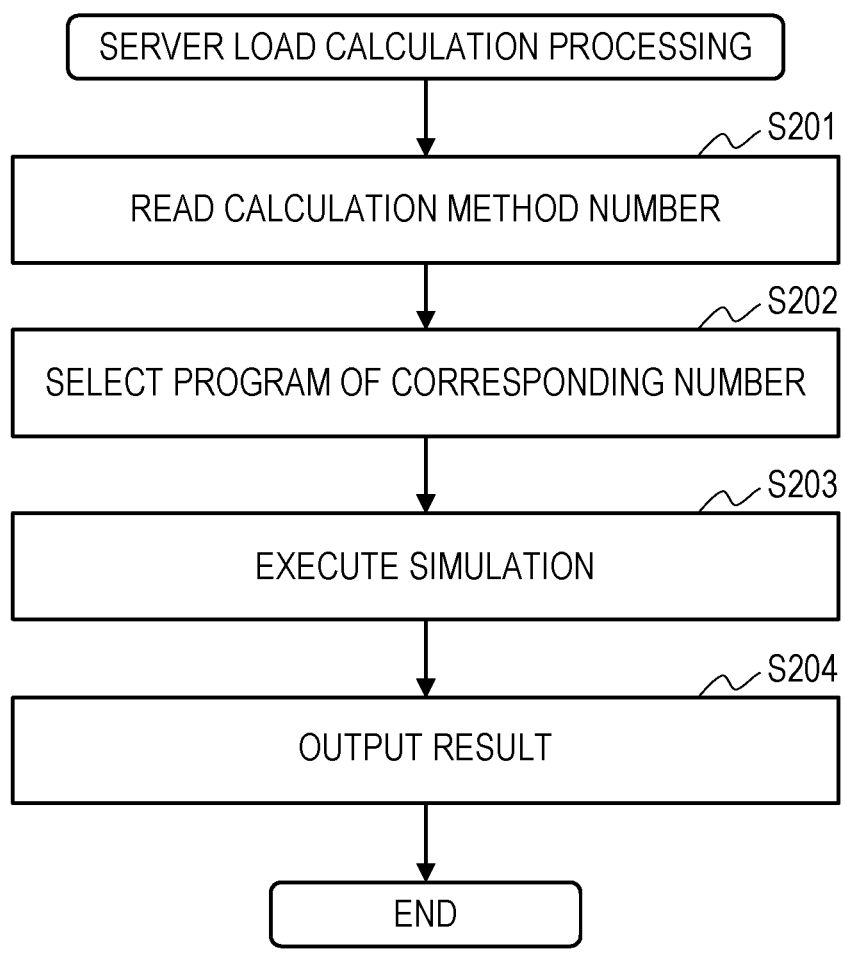
FIG. 12 is a flowchart illustrating an example of a processing procedure for server load calculation processing.

FIG. 12 is a flowchart illustrating an example of a processing procedure for server load calculation processing. FIG. 12 illustrates an example of a detailed processing procedure for the server load calculation processing executed in step S109 of FIG. 11.

In the server load calculation processing, an operation of the server load calculation unit 130 is started when the input parameter 650 is input from the input parameter creation unit 124 of the input information creation unit 120. At this time, the input interface 131 of the server load calculation unit 130 reads the calculation method number 653 from the input parameter 650 (Step S201).

Next, the calculation execution unit 132 selects a program of number corresponding to the calculation method number 653 read in step S201 from the programs stored in the program storage unit 133 (Step S202), and executes the simulation for calculating a server load by executing the selected program according to the input parameter 650 (Step S203).

When the simulation is completed, the calculation execution unit 132 outputs the calculation result of the simulation to the output interface 134, and the output interface 134 outputs the calculation result of the simulation to the output unit 140 (Step S204).

As described above, the server load calculation unit 130 can calculate the load applied to the server 23 of the production process system 20 by executing the server load calculation processing, and the calculation of the load of the server 23 is executed by using various simulation programs under various conditions according to the calculation condition 630 designated by the user.

In the present embodiment, specifically, as a server load, for example, a ratio of a calculation amount required by an apparatus with respect to an upper limit (the server capability) of a calculation amount of a server can be calculated. In the present embodiment, a target of the server load which can be calculated, is not limited to the "calculation amount", and the same applies to other parameters such as a memory and a storage included in the server load information 613 of the apparatus requirement specification table 610. In the following, the "calculation amount" is exemplified as a parameter (an item) that has the greatest influence on the server load, and in the connection relationship between the apparatus and the server, the calculation amount required for the server is referred to as a "server load".

The server load calculation unit 130 holds a plurality of simulation programs for calculating the server load (here, the calculation amount required for the server) in the program storage unit 133, and the user can perform a calculation of the server load in a desired calculation method depending on which number is designated in the calculation method number 631 of the calculation condition 630. Specifically, in a case of the server load calculation unit 130 shown in FIG. 5, the simulation programs (the programs of numbers 1 to 3) corresponding to three kinds of calculation methods (the calculation methods 1 to 3) are stored in the program storage unit 133, and the user can calculate the server load in a desired calculation method by designating any of "number 1" to "number 3" in the calculation method number 631 of the calculation condition 630.

Feature and effect of each program corresponding to each calculation method will be described below.

The program of number 1 simulates the server load based on the connection relationship designated by the user. Therefore, when the program of number 1 is designated, the user is required to input the connection relationship 637 to the calculation condition 630. Since the programs of numbers 2 and 3 calculate the server load by changing the connection relationship between the apparatus and the server in various ways in the simulation process, it is not required to input the connection relationship 637 to the calculation condition 630.

When the program of number 1 is designated, the load of each server can be calculated in the connection relationship between the apparatus and the server which are designated by the user. Therefore, it can be expected that the necessary calculation amount is small and the calculation result can be obtained in a relatively short time compared with the simulation by the programs of numbers 2 and 3. However, in the simulation of number 1, when the content of the connection relationship 637 designated by the user is not appropriate, there is a possibility that a great deviation occurs in the server load between the servers or there is a possibility that a sever exists which have a server load exceeding the upper limit of the specification.

In the simulation by the program of number 2, the number of servers required to satisfy the apparatus requirement specification (the apparatus requirement specification 651) is calculated based on the apparatus, and the load of each server is calculated after a connection between each server and the apparatus is determined. In the simulation of number 2, a combination of the server and the apparatus may be made such that the upper limit of the specification of the server (the server specification 652) is not exceeded and the number of the required servers is small, and in the combination of the server and the apparatus, the server load may be calculated by using the existing algorithm (for example, the algorithm for solving a bin packing problem).

Therefore, when the program of number 2 is designated, the load of each server can be calculated after considering the suitable connection relationship between the server and the apparatus with priority to the apparatus requirement specification. When the above-described algorithm or the like is used, the load of each server can be calculated by setting the connection relationship between the server and the apparatus to be close to an optimal solution. However, in the simulation of number 2, since the apparatus requirement specification is prioritized, the result that the number of servers greater than the number of the servers which the user assumes may be output.

When the program of number 2 is designated, from the result of the simulation, the user can obtain knowledge that how many more servers are needed and which capability the servers have, or the apparatus requirement specification is satisfied by using a smaller number of servers than the number of the servers assumed by the user so as to satisfy the apparatus requirement specification. By comparing the result of the simulation with the connection relationship assumed by the user, it is possible to know the degree of an excess or a shortage of the capability of the server. Therefore, when the shortage of the server is found, it is helpful to consider adding the servers so as to improve the system configuration before an actual failure occurs. When the excessive server is found, it is helpful to consider stopping the use of the excessive server so as to save energy in the system. By grasping the degree of the load of each server from the calculation result, it becomes possible to consider in advance about another connection between the server and apparatus by assuming failure of one of the servers.

In the simulation by the program of number 3, the connection between the server and the apparatus is determined within a range not exceeding the upper limit of the server specification (the server capability) based on the server specification and the number of servers, and the load of each server is calculated. In the simulation of number 3, in order to determine an efficient connection relationship between the server and the apparatus, the connection relationship may be calculated by using the existing algorithm (for example, the algorithm for solving a knapsack problem). However, in the simulation of number 3, since the server specification and the number of servers are fixed and the simulation is executed, there may be an apparatus which is not capable of being connected to the server when a total of the requirement specifications of each apparatus exceeds the server capability.

Therefore, when the program of number 3 is designated, the load of each server can be calculated after considering the suitable connection relationship between the server and the apparatus with priority to the server specification. From the result of this simulation, the user can know the configuration of the apparatus that can be accommodated (processed) by the existing server. When the above-described algorithm or the like is used, the load of each server can be calculated by setting the connection relationship between the server and the apparatus to be close to an optimal solution.

It is clear that the above-described three calculation methods 1 to 3 (the programs of numbers 1 to 3) are merely examples, and the present embodiment is not limited to these methods. In addition, for example, the calculation method may be a calculation method in which the connection relationship between the server and the apparatus is determined such that the number of the apparatuses connected to the server becomes equal, and the server load is calculated. For example, the method also may be a method in which the connection relationship is designated such that the apparatus is connected to the server which is physically the closest to the apparatus, and the server load is calculated.

FIG. 13 is a diagram illustrating an example of a screen 660 displaying a simulation result. The screen 660 in the display device 19 displays a calculation result of the simulation, which is output by the output unit 140 in step S110 of FIG. 11.

The result displayed on the screen 660 of FIG. 13 includes a calculation method number 661, a server load 662, and a connection relationship between server and apparatus 663.

Number corresponding to the calculation method used in the simulation is displayed in the calculation method number 661. In FIG. 13, since "Number 1" is displayed, it can be seen that the server load calculation is executed by the calculation method 1.

The calculation result of server load is displayed in the server load 662. When the server load is expressed as a ratio of the required calculation amount by the apparatus to the upper limit of the server calculation amount (the server capability), the result of the server load, for example, is displayed like "Server A: 30% of upper limit designated by user" as shown in FIG. 13. In this case, it means that as the calculation result of the simulation, the load (the calculation amount) predicted in the server A is a calculation amount which is 30% of the server capability at the time of the operation designated in the calculation condition 630. By displaying the server load 662 in this way, it is possible to indicate whether or not the server load calculated by the simulation is excessive in an allowable server capability designated by the user.

The connection relationship between the server and the apparatus when the server load 662 is calculated in the simulation is displayed in the connection relationship between server and apparatus 663. In FIG. 13, since the calculation method number 661 is "Number 1", the calculation of the server load is executed in the connection relationship designated by the user, and a display content of the connection relationship between server and apparatus 663 corresponds to the connection relationship 637 of the calculation condition 630.

The screen of FIG. 13 is only an example, and the output unit 140 according to the present embodiment may output any information in the server load prediction system 10.

As described above, the server load prediction system 10 according to the first embodiment can predict the server load of the server 23 connected to the apparatus in the production process and indicates the result to the user before starting the production process (or before a change of a configuration is made in the production process) by preforming the server load prediction processing to calculate and output the server load based on the calculation condition 630 designated by the user. As a result, the user can grasp an excess or shortage of the server, and when the shortage of the server is predicted, the user can consider whether to prepare the necessary server before starting the production process. When an excess of the server is predicted, the user can consider whether to continue using the server in the production process, and can save energy in the production process in case of stop using of the excess server.

In the present embodiment, in the server load prediction processing, the server load can be calculated with high accuracy by using data in consideration of information on a work using an apparatus and a worker, and information on an analysis model analyzing data from the apparatus (for example, the camera 22) as well as an apparatus name connected to the server (see the apparatus requirement specification table 610 of FIG. 6).

In the present embodiment, in the server load prediction processing, since the calculation method for calculating the server load can be selected from a plurality of calculation methods (for example, calculation methods 1 to 3), the server load can be predicted in the method satisfying a user request.

In the present embodiment, as a derivative example, when "Number 2" or "Number 3" is designated in the calculation method number 633 of the calculation condition 630, the system configuration assumed by the user may be input to the calculation condition 630. In this case, a function of comparing the system configuration assumed by the user with the calculation result of the simulation is provided and the output unit 140 outputs the comparison result. According to this, the excess or shortage of the server obtained by the simulation can be indicated clearly on the screen 660 in the display device 19. As a specific example of screen, when the result that there is a shortage of the server is obtained, "Shortage of server: xx more servers with performance xx are required" may be displayed, or when the result that there is an excess of the server is obtained, "Excess of server: xx servers with performance xx can be stopped" may be displayed.

In the present embodiment, to obtain an optimal or nearly optimal connection between the server and the apparatus, a machine learning method may be applied in the server load calculation unit 130.

2. Second Embodiment

A server load prediction system 40 according to the second embodiment of the present invention will be described. In the second embodiment, a difference from the server load prediction system 10 according to the first embodiment will be mainly described, and the configurations and processes common to the first embodiment will be omitted.

The server load prediction system 10 described above according to the first embodiment calculates the server load according to the input condition (the calculation condition 630) and outputs the calculation result, but the server load prediction system 40 according to the second embodiment can search for an operation condition or a system configuration in which a calculation result of the server load is equal to or less than a threshold in a list created in advance (an operation change list 670 which will be described later) by changing the operation condition or the system configuration of an apparatus or a server such that the server load is equal to or less than the threshold to calculate the server load.

In the second embodiment, an upper limit of an allowable server load is set by the user in advance as a threshold. A case where the server load calculated with calculation Method 1 exceeds the upper limit specified by the user, a case where at least any of a server capability or number of servers calculated with calculation Method 2 is greater than the capability or the number supposed by the user, or a case where at least an apparatus which is not connected to the server exists when calculated with Method 3 is expressed as "server load exceeds the threshold".

When the server load exceeds the threshold, as described in the first embodiment, one countermeasure is proposed that an additional server is provided to reduce the excessive load of the server. However, the server load prediction system 40 according to the second embodiment is particularly effective when it is desired to consider other countermeasures since it is difficult to add a server or it takes time to add the server. The server load prediction system 40 according to the second embodiment is particularly effective when it is desired to consider a method of changing the operation of the apparatus as a countermeasure when the server suddenly fails.

Figure 14:
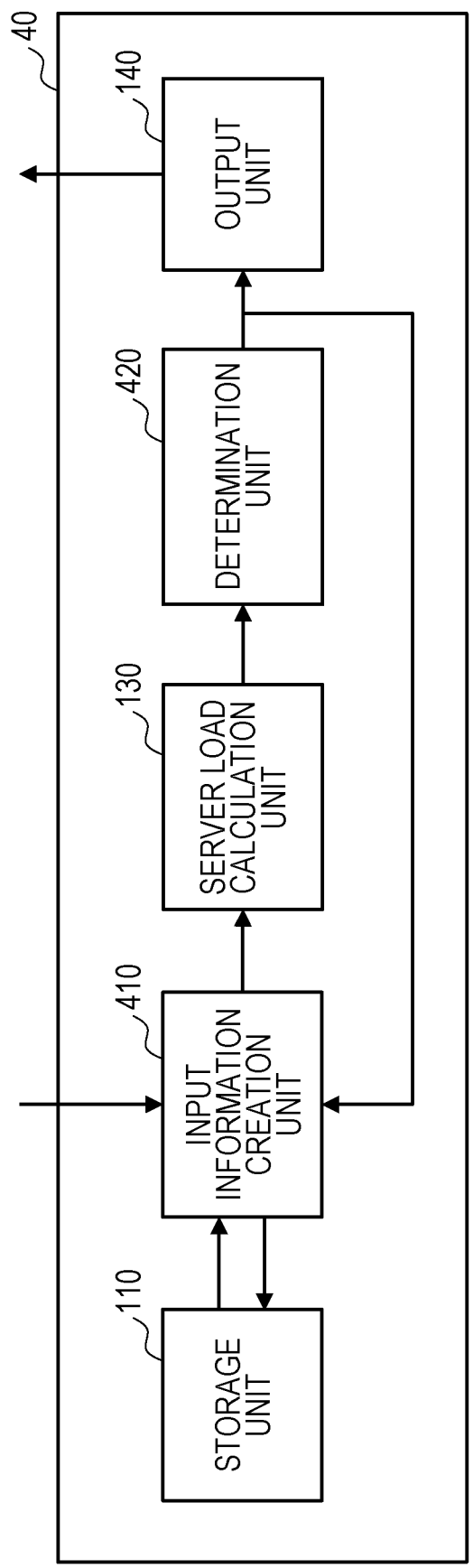
FIG. 14 is a block diagram illustrating a function configuration example of a server load prediction system according to a second embodiment.

FIG. 14 is a block diagram illustrating a function configuration example of the server load prediction system 40 according to the second embodiment. As shown in FIG. 14, the server load prediction system 40 is different from the server load prediction system 10 according to the first embodiment (see FIG. 3) in that the input information creation unit 120 is replaced with an input information creation unit 410 and a determination unit 420 is added.

Similarly to the input information creation unit 120 according to the first embodiment, the input information creation unit 410 has a function of creating an input parameter required for a server load calculation of the server load calculation unit 130 and outputting the created input parameter to the server load calculation unit 130. The input information creation unit 410 has a function of recreating an input parameter after changing an operation condition or a system configuration of the server or the apparatus based on a list created in advance (the operation change list 670 of FIG. 16) when the determination unit 420 determines that the server load exceeds a threshold. An internal configuration of the input information creation unit 410 is the same as the configuration of FIG. 4 described in the first embodiment, and is not shown in the drawing.

The determination unit 420 has a function of determining whether or not the calculation result of the simulation by the server load calculation unit 130 may be output as the final calculation result in the server load prediction processing. Details of the determination processing will be described in the explanation of the server load prediction processing in FIG. 15.

Although not shown in FIG. 14, as information for managing the change of the operation condition of the apparatus or the server in the production process, the operation change list 670 is created in advance and stored in the server load prediction system 40 (for example, the storage unit 110 or the input information creation unit 410). The operation change list 670 may be referred to in the server load prediction processing shown in FIG. 15, and the specific example thereof is shown in FIG. 16.

Figure 15:
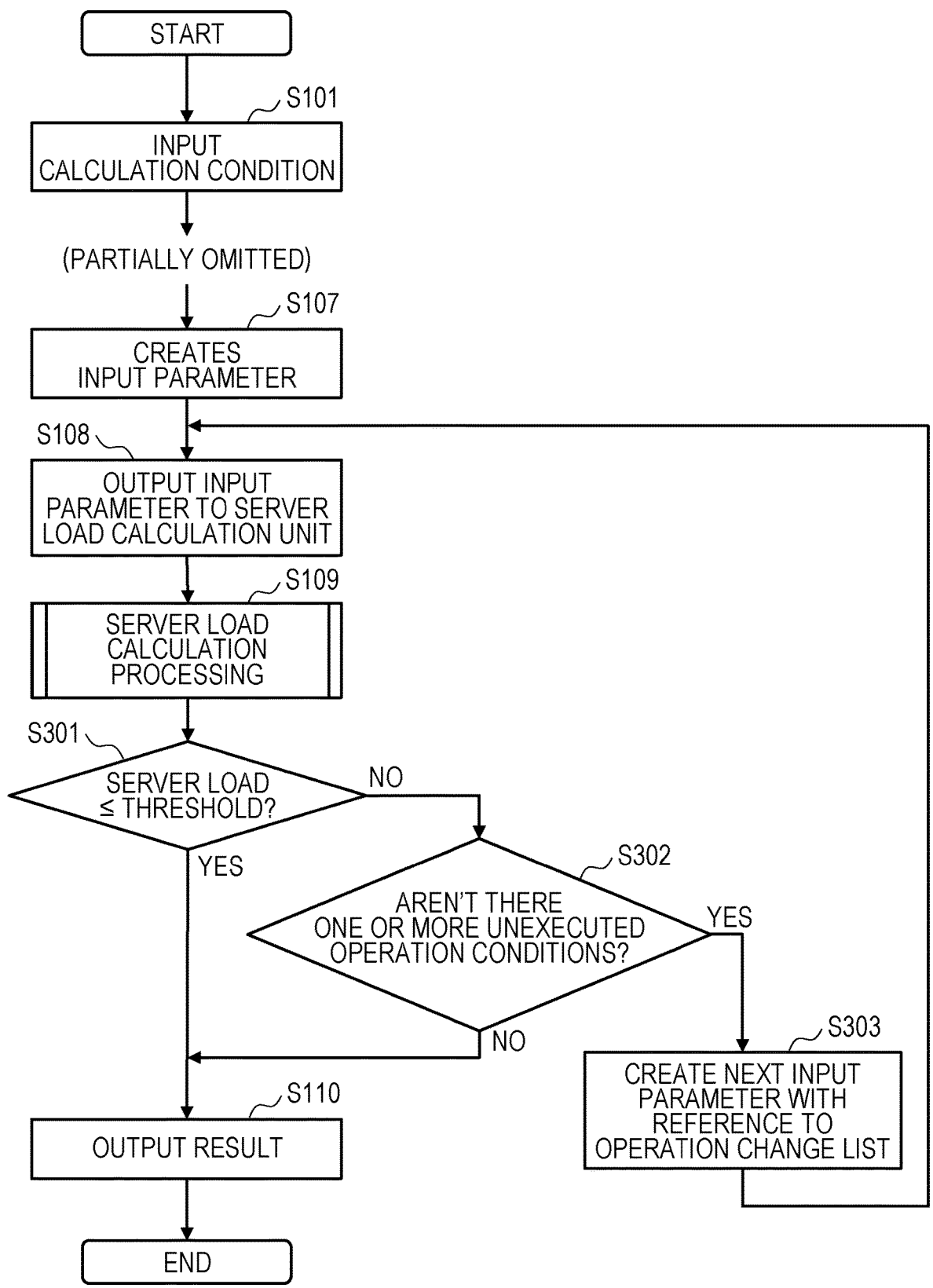
FIG. 15 is a flowchart illustrating an example of a processing procedure of server load prediction processing according to the second embodiment.

FIG. 15 is a flowchart illustrating an example of a processing procedure of the server load prediction processing according to the second embodiment. Hereinafter, the server load prediction processing executed by the server load prediction system 40 will be described in detail with reference to FIG. 15, but the same processes as in the server load prediction processing shown in FIG. 11 in the first embodiment are denoted by the same step number and the description thereof will be omitted.

First, in FIG. 15, processes (Steps S101 to S109) in which the calculation condition designated by the user is input to the input information creation unit 410 and then the first simulation is executed by the server load calculation unit 130 are the same as in the first embodiment (steps S101 to S109 in FIG. 11). In the server load calculation processing in step S109, the server load calculation unit 130 outputs the calculation result of the simulation including the server load to the determination unit 420.

Next, the determination unit 420 compares the server load calculated in the server load calculation processing in step S109 with the upper limit (the threshold) of the server load set in advance by the user, and determines whether or not the server load is equal to or less than the threshold (Step S301).

In step S301, since it is determined that the server load does not need to be recalculated when the server load is equal to or less than the threshold (YES in step S301), the determination unit 420 outputs the calculation result of the simulation to the output unit 140 and then the process proceeds to Step S110. In step S110, as described in the first embodiment, the output unit 140 outputs the calculation result of the simulation to the outside, and ends the server load prediction processing.

On the other hand, in step S301, when the server load exceeds the threshold (NO in step S301), the determination unit 420 determines whether or not there are one or more unexecuted operation conditions in the operation conditions described in the operation change list 670 with reference to the operation change list 670 (Step S302).

Return to the description of FIG. 15. In step S302, since the operation condition is not capable of being changed any more when the unexecuted operation condition does not exist in the operation change list 670 (NO in step S302), the determination unit 420 outputs the calculation result of the simulation to the output unit 140 and then the process proceeds to Step S110. On the other hand, in step S302, when there is the unexecuted operation condition in the operation change list 670 (YES in step S302), the determination unit 420 notifies the input information creation unit 120 of the change of the operation condition, and then the process proceeds to Step S303.

In step S303, the input information creation unit 120 creates an input parameter for a next simulation based on a record in which the order of a calculation has the highest priority among records in which the operation condition is not executed with reference to the operation change list 670.

After the processing in step S303, the server load calculation unit 130 re-executes the simulation based on the re-created input parameter by returning to step S108 and performing the subsequent processing. The above processing is repeatedly performed until the server load becomes equal to or less than the threshold (YES in step S301) or the operation condition 674 in which the simulation is not executed disappears (NO in step S302).

FIG. 16 is a table illustrating an example of the operation change list 670. The operation change list 670 is a list for managing a change of the operation condition of the apparatus or the server in the production process, and is a collection of a plurality of prioritized operation conditions. In FIG. 16, the operation change list 670 includes data items of a calculation order 671, an apparatus 672, an operation change content 673, and an operation condition 674. The calculation order 671 indicates a priority order when the operation condition 674 is changed and the simulation is executed in a case where the server load exceeds the threshold, and is selected in ascending order of priority. The apparatus 672 indicates an apparatus that changes an operation. The operation change content 673 indicates a content of the changed operation. The operation condition 674 indicates a change content of a requirement specification of the apparatus for the server.

A flow of the server load prediction processing in FIG. 15 is specifically confirmed by using the operation change list 670 in FIG. 16.

When the load of at least one server of a plurality of the servers 23 of the production process system 20 exceeds the threshold in the calculation result of the first simulation (NO in step S301), the input information creation unit 410 recreates the input parameter (Step S303), and the server load calculation unit 130 performs the simulation (the server load calculation processing) (Step S109) after the determination unit 420 performs the determination in step S302.

The simulation based on the recreated input parameter is executed by applying the operation condition 674 of a record in which "1" is indicated in the calculation order 671 in the operation change list 670. More specifically, it is assumed that by changing a transmission interval of an image transmitted from the camera A to the server from a normal interval of 100 ms to an interval of 200 ms, the requirement specification for the server is set to be 0.5 times the normal value, according to this assumption, the simulation is executed.

Even in the calculation result of the above-described simulation, when the load of at least one server exceeds the threshold (NO in step S301), the input parameter is created and the simulation is executed again by applying the operation condition 674 of a record in which "2" is indicated in the calculation order 671 in the operation change list 670. In this case, it is assumed that by changing a transmission interval of an image transmitted from the camera A and a camera D to the server from a normal interval of 100 ms to an interval of 200 ms, a requirement specification of two cameras for the server is set to be 0.5 times the normal value, according to this assumption, the simulation is executed.

As described above, in the server load prediction processing of FIG. 15, the simulation is repeatedly executed while changing the operation condition 674 with reference to the calculation order 671 of the operation change list 670 until the server load of each of a plurality of the servers 23 of the production process system 20 is equal to or less than the threshold (YES in step S301) or the unexecuted operation condition 674 disappears in the operation change list 670 (NO in step S302).

A change of the operation condition that can be executed in the second embodiment is not limited to the contents in the operation change list 670 shown in FIG. 16, and various changing methods can be adopted.

For example, as an example of the operation change content 673, changing a server of a connection destination of the apparatus and the related apparatus is considered. Specifically, for example, in the apparatus requirement specification table 610 of FIG. 6, there is a "camera A" as a related apparatus of an "apparatus A", but in the first simulation, a calculation is executed under a restriction condition that the apparatus and the related apparatus are connected to the same server. As a result, when the server load exceeds the threshold, a subsequent calculation may be performed under a moderated condition that the related apparatus (the camera A) may be connected to a server which is different from the apparatus (the apparatus A).

For example, the calculation may be performed under a moderated condition that not only the condition of the apparatus but also the server specification is changed, that is, the upper limit of the calculation amount, the memory and the storage of the server is increased, and the increase in the threshold may be indicated to the user. In this case, after a condition indicating how much a threshold for each server is increased and the calculation order thereof are set, the calculation may be performed with reference to the settings. As a result, for example, information that "when a threshold which is 1.1 times the initially set threshold is set, the server load is equal to or less than the threshold" is indicated to the user.

By using a method of changing an analysis model used for a data analysis to a model which requires less calculation amount, but analysis accuracy deteriorates, a condition that the server load is equal to or less than the threshold is calculated, and the operation method and the calculation result of the server load may be indicated to the user.

In the above description, the change of the operation of the apparatus, the change of the restriction of the connection between the server and the apparatus, the change of the specification of the server, and the change of the analysis model are explained separately, but a change of the operation condition that combines these changes may be indicated.

In the server load prediction processing shown in FIG. 15, since the calculation is executed repeatedly until an end condition is satisfied, it may take time to output a final calculation result of the simulation. In general, in an algorithm for determining a connection relationship between a server and an apparatus, it is considered to take time when a calculation method which outputs the result closer to an optimal solution is used. Therefore, in the program of the calculation method in which the connection between the server and the apparatus is determined by the algorithm (the calculation method 2 or the calculation method 3 described in the first embodiment), a plurality of calculation algorithms are prepared, in which an optimality deteriorates compared with the optimal solution, but the result can be output in a short time with respect to the connection between the server and the apparatus or a calculation time is long, but the result closer to an optimal solution can be output with respect to the connection between the server and the apparatus, and the algorithm may be selected based on a length of a time that the user can wait until the user obtains the result. In this case, the user may designate the calculation method number, or the user inputs an allowable time as the calculation condition, and then the server load prediction system 40 may select a method used in the calculation from the input allowable time and information on the process.

Figure 17:
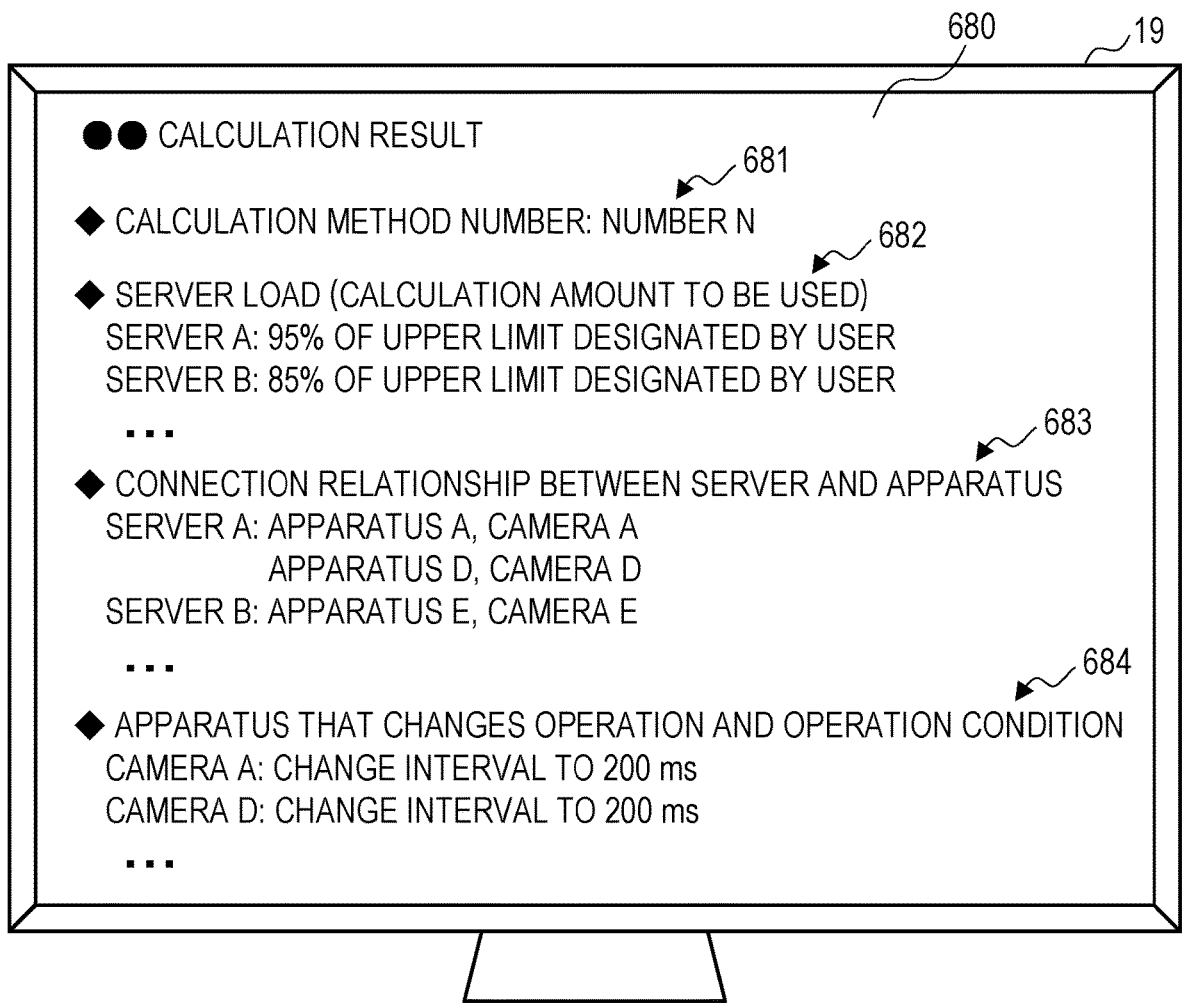
FIG. 17 is a diagram illustrating an example of a screen displaying a simulation result.

FIG. 17 is a diagram illustrating an example of a screen 680 displaying a simulation result. The screen 680 in the display device 19 displays a calculation result of the simulation, which is output by the output unit 140 in step S110 of FIG. 15.

The result displayed on the screen 680 of FIG. 17 includes a calculation method number 681, a server load 682, a connection relationship between server and apparatus 683, and an apparatus that changes operation and operation condition 684. The connection relationship between the server and the apparatus is displayed in the connection relationship between server and apparatus 683. When there is an apparatus that changes an operation, the apparatus and the operation condition are displayed in the apparatus that changes operation and operation condition 684.

As described above, the server load prediction system 40 according to the second embodiment can calculate and output the server load based on the calculation condition 630 designated by the user by executing the server load prediction processing. In addition, when the calculation result of the server load exceeds the threshold set in advance, the server load prediction system 40 according to the second embodiment recalculates the server load based on the condition in the operation change list 670. Therefore, the server load prediction system 40 can search for the operation condition that the server load can be equal to or less than the threshold or the system configuration in which the server load can be equal to or less than the threshold. Before starting the production process (or before a change of a configuration is made in the production process), the server load prediction system 40 according to the second embodiment not only can predict the load of the server 23 connected to the apparatus in the production process through the simulation and indicate the result to the user, but also can indicate the operation condition or the system configuration to the user in order to avoid the excess of the server load when the server load exceeds the threshold.

In the present embodiment, the production process system 20 shown in FIG. 2 is described as a target of a server load prediction. In a case when another server (an upper level server) is provided at an upper level of the server A (the server 231) and the server B (the server 232) in the production process system 20, the server load prediction system 40 may include a simulation program in which by sharing a part of processing supposed to be executed by the server A or B with the upper level server to make the load of each server to be equal to or less than the threshold.

3. Third Embodiment

In the first and second embodiments described above, it is described that the server load prediction systems 10 and 40 predict the load of the server with respect to the production process system 20 in which the apparatus is connected to the server via a wired network 24 (see FIG. 2). However, the production process system in which the server load prediction system of the present invention can predict the server load is not limited to the production process system 20. In the third embodiment, a server load prediction system that predicts a server load for a production process system including a wireless network (a production process system 50 shown in FIG. 18) will be described.

Figure 18:
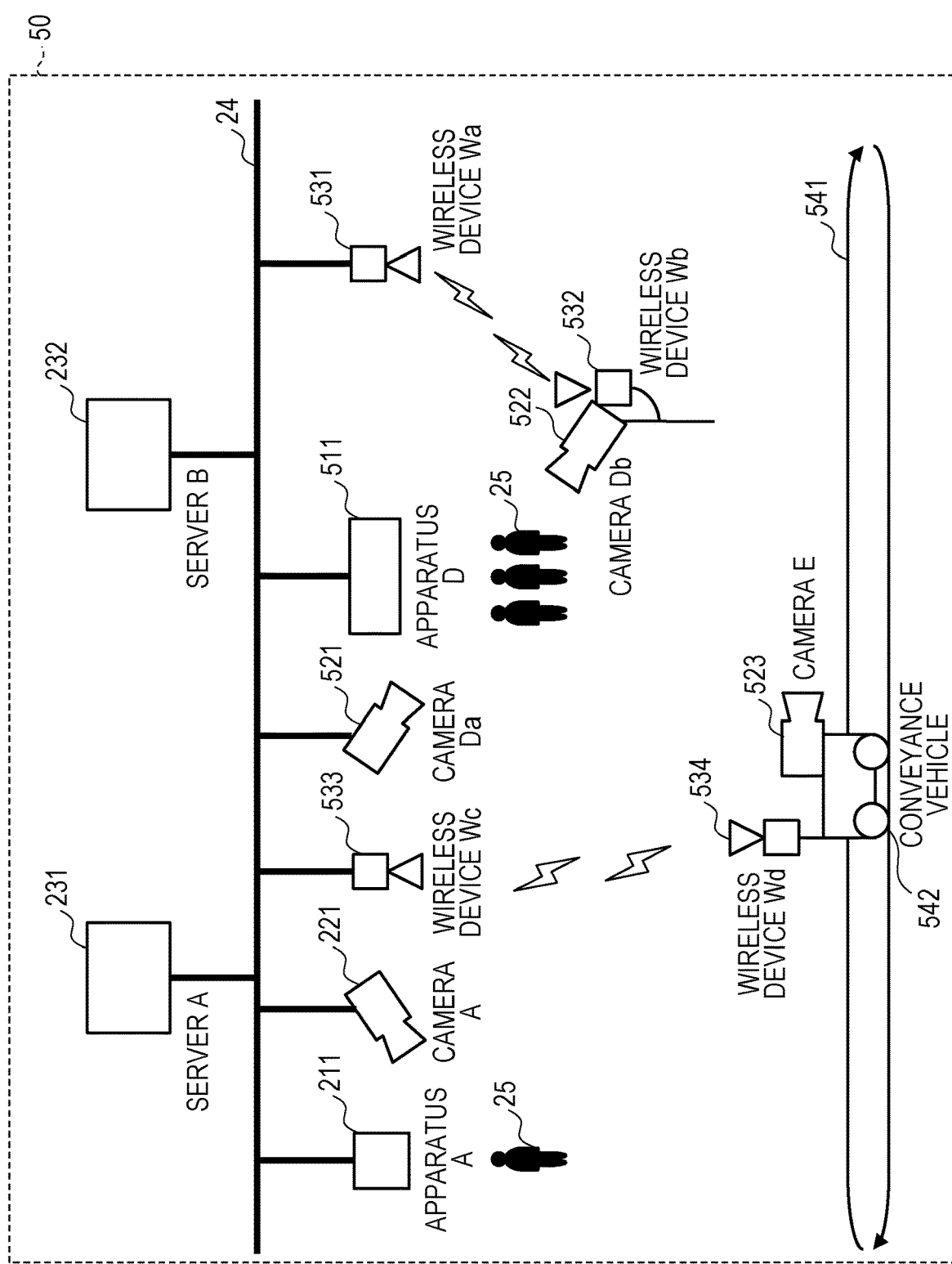
FIG. 18 is a block diagram illustrating a configuration example of a production process system in operation.

FIG. 18 is a block diagram illustrating a configuration example of a production process system 50 in operation. The production process system 50 is a system constructed with production processes assuming that at least some of the apparatuses communicate with a server wirelessly. The same configuration as the production process system 20 will be denoted by the same reference numerals and the description thereof will be omitted.

As shown in FIG. 18, the production process system 50 includes a server 231 (a server A), a server 232 (a server B), a production apparatus 211 (an apparatus A), a production apparatus 511 (an apparatus D), a camera 221 (a camera A), a camera 521 (a camera Da), a camera 522 (a camera Db), a camera 523 (a camera E), a wireless device 531 (a wireless device Wa), a wireless device 532 (a wireless device Wb), a wireless device 533 (a wireless device Wc), a wireless device 534 (a wireless device Wd), and a conveyance vehicle 542 that moves along a determined route 541.

In the production process system 50, the cameras Da and Db photograph a motion of a worker 25 using the apparatus D, and the camera E is mounted on the conveyance vehicle 542 to photograph the surroundings of the conveyance vehicle 542. The image captured by the camera Db is transmitted from the wireless device Wb to the wireless device Wa by a wireless communication, and then transmitted from the wireless device Wa to the server A or the server B by wire. The image captured by the camera E is, for example, transmitted from the wireless device Wd to the wireless device Wc by wireless communication, and then transmitted from the wireless device Wc to the server A or the server B by a wire. The communication between the conveyance vehicle 542 and the server A or the server B (for example, a transmission of a control signal to the conveyance vehicle 542) is also performed by using the wireless communication between the wireless device Wd and the wireless device Wc.

As described above, in the production process system 50 in which at least some of the apparatuses perform a wireless communication with the server, a communication speed fluctuates depending on a state of radio waves. Since the wireless device Wd mounted on the conveyance vehicle 542 moves in accordance with the movement of the conveyance vehicle 542, the communication speed changes depending on a relative relationship with the wireless device Wc to be a communication partner, and the communication may be disconnected when the radio wave is shielded by other apparatuses. In this way, in the wireless communication, since data that reaches the server from the apparatus may fluctuate with time, it is assumed that the load applied to the server A or the server B, which is caused by the apparatus that transmits the data to the server A or the server B by the wireless communication (for example, the camera Db, the camera E, and the conveyance vehicle 542), is changed with time.

In the present embodiment, when the server load prediction system (for example, the server load prediction system 10 or the server load prediction system 40) predicts the load of the server with respect to the production process system 50, the processing is performed as follows.

As a first example, the server load prediction system calculates a change in communication volume generated by the wireless communication by executing a simulation when the conveyance vehicle 542 moves along the route 541, calculates a change of the server load by using the calculated communication volume, and uses the calculation result as the apparatus requirement specification of the conveyance vehicle 542 for the server.

As a second example, a network monitoring and analysis function that monitors and analyzes the network state is implemented in the server A or other apparatuses. When the conveyance vehicle 542 moves along the same route 541 at the same speed or when the conveyance vehicle 542 moves along the similar route with similar speed, the communication between the wireless device Wd and the server A is analyzed by using the network monitoring and analysis function. A change of the server load is calculated from the change in the communication volume obtained by the analysis. And the calculated change is stored in the server A or other apparatuses. Then, the server load prediction system uses the stored change of the server load as the apparatus requirement specification.

In the present embodiment, the server load can be predicted from a cumulative relative frequency by obtaining a statistical processing from the change of the server load obtained by the simulation or monitoring as mentioned above.

Figure 19:
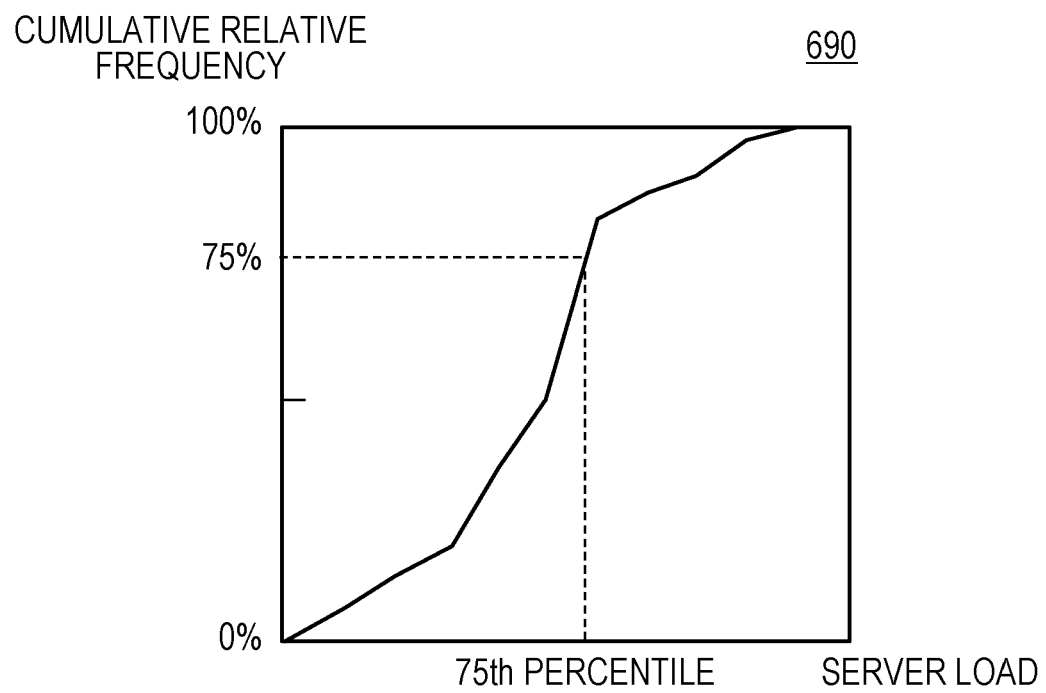
FIG. 19 is a graph illustrating an example of a cumulative frequency distribution of a server load.

FIG. 19 is a graph illustrating an example of the cumulative frequency distribution of a server load. A graph 690 shown in FIG. 19 is a graph illustrating an example of a change of the server load, the graph having a cumulative relative frequency in a vertical axis and the server load in a horizontal axis. In the graph 690, the server load can be predicted by designating the cumulative relative frequency. Specifically, for example, the broken line in the graph 690 indicates that the server load is equal to or less than a value indicated as a 75th percentile with a probability of 75%. Therefore, when the calculation is executed under a condition satisfied with a probability of 75%, the server load prediction system may calculate a numerical value corresponding to the 75th percentile as the apparatus requirement specification.

When a cumulative frequency distribution is changed by a condition such as a production process, a route of conveyance vehicle 542, or a time of day such as morning, afternoon and night, the cumulative frequency distribution may be obtained under each condition. And then the value of the server load obtained from the cumulative frequency distribution may be used as the apparatus requirement specification.

When the server load is changed as described above, the user may input the value of the apparatus requirement specification itself as the calculation condition 630 to the server load prediction system. The server load prediction system may be configured to create a table in advance, in which numerical values that may be used for a calculation such as a 75th percentile, a 95th percentile, an average value, and a median value are collected, store the table in the server load prediction system, and calculate a value of the server load corresponding to an Xth percentile indicated in the table as the apparatus requirement specification when the user inputs the "Xth percentile" to the calculation condition 630.

As described in the first embodiment, the camera (for example, the camera 22) installed in the production process is installed to analyze a motion of the worker 25 in the image data captured by the camera on the server 23, and a required calculation amount of the server, that is, the server load may be changed depending on the number of workers in the image data in accordance with an analysis model to be used. Therefore, even when the same amount of data is periodically transmitted to the server 23 (the server 231 and the server 232) from the same apparatus, the server load may be changed.

In the present embodiment, similarly to a case where the conveyance vehicle 542 is connected to the server via a wireless communication, the above-described method, in which the apparatus requirement specification is calculated from the change of the server load, can be applied to the apparatus requirement specification of the camera. In this case, similarly to the wireless communication, the camera, in which the number of people in the image changes, also uses numerical values such as an Xth percentile, an average value, a median value, and a maximum value of the cumulative frequency distribution as the apparatus requirement specification, and the server load can be predicted based on the apparatus requirement specification thereof.

In the present embodiment, when the server load is changed depending on the calculation condition, the output unit 140 may output the result of the simulation and the condition of the simulation to be indicated to the user. For example, when analyzing the image of the camera, the load of the server is changed depending on the number of people present in the image. Therefore, "in this calculation, when a probability of one person is 80%, a probability of two people is 15%, and a probability of three people is 5% with respect to the number of people in the image, the server load satisfied with a probability of 95% was calculated as the apparatus requirement specification" may be indicated to the user. In the present embodiment, since the simulation condition is also displayed as described above, the user can confirm the calculation condition of the server load. Therefore, it is useful for designating the subsequent calculation condition.

As described above, in the present invention, the server load after processes are changed can be predicted by constructing the server load prediction system according to each embodiment, and a system configuration and an operation condition of each apparatus and a server can be proposed for preventing the server load from exceeding the threshold. As a result, when the server load exceeds the threshold, the user may consider adding a server, and when it is difficult to add the server or it takes time to add the server, the user may consider reducing the load of the server by changing the operation of the apparatus. As a result of predicting the server load, when a server, of which an arithmetic capability is smaller than that of the server to be initially used, and which is excellent from a viewpoint of saving energy, is provided, and it is known that even the server of which the arithmetic capability is small can satisfy the requirement specification of the apparatus, the user may consider replacing the server with the server of which the arithmetic capability is small.

The present invention is not limited to the first to third embodiments described above, and includes various modification examples and the same configurations within the scope of the attached claims. For example, the above-described embodiments have been described in detail in order to describe the present invention in an easy-to-understand manner, and are not necessarily limited to those including all the described configurations. A part of the configurations of an embodiment may be replaced with a configuration of another embodiment. Another configuration of an embodiment may be added to a configuration of certain embodiment. It is possible to perform addition, deletion, and replacement of other configurations with respect to a part of the configurations of each embodiment. For example, in each embodiment, the configuration in which a plurality of the servers are provided in the production process is described, and the present invention can be applied even when there is one server.

A part or all of the configurations, functions, processing units, and processing means in the embodiments, which are described above, may be realized by hardware, for example, by designing an integrated circuit. The configurations, and functions, which are described above, may be realized by software by a processor interpreting and executing a program that implements each function. Information such as a program, a table, and a file, which implements each function, can be stored in a storage device such as a memory, a hard disk and an SSD, or a recording medium such as an IC card, an SD card, and a DVD.

In the drawings, control lines and information lines are shown since it is necessary for an explanation, and all the control lines and information lines may not necessarily be shown in the product. In practice, it may be considered that almost all configurations are connected to each other.

What is claimed is:

1. A server load prediction system that predicts a server load on one or more servers connected to one or more apparatuses installed in a production process, the system comprising:
  one or more apparatuses, wherein an apparatus performs predetermined work in the production process;
  one or more information acquisition devices, wherein an information acquisition device is configured to acquire information about the production process and transmit the information to the one or more servers,
  a memory configured to store:
  an apparatus requirement specification regarding each apparatus based on information received from the one or more information acquisition devices, the apparatus requirement specification including a server load information and a work information, wherein the server load information indicates a load applied to a server of a connection destination for a control of an apparatus or processing of information transmitted from the apparatus, and wherein the work information indicates information on a predetermined work performed by the apparatus;
  a server specification indicating a capability held by each server of the one or more servers based on information received from the one or more information acquisition devices;
  one or more processors configured to:

receive an input of a calculation condition including a designation of a process of predicting the server load, generate an input parameter, wherein the input parameter is required to execute a simulation for calculating the server load based on the calculation condition, the apparatus requirement specification, and the server specification, calculate the server load applied to the server of the connection destination, which is caused by the apparatus used in the process designated under the calculation condition, by executing the simulation based on the input parameter; and a display screen that outputs a calculation result obtained by the processor.

2. The server load prediction system according to claim 1, wherein the processor holds process-apparatus conversion information indicating a correspondence relationship between each process in the production process and an apparatus used in each process, and determines the apparatus used in the process designated under the calculation condition and generates the input parameter by using the server load information corresponding to the apparatus based on the work information and the process-apparatus conversion information.

3. The server load prediction system according to claim 1, wherein under the calculation condition, when a connection relationship between the apparatus and the server in the process is designated in addition to the designation of the process of predicting the server load, the processor calculates the server load on the server based on the connection relationship designated under the calculation condition in the simulation.

4. The server load prediction system according to claim 1, wherein under the calculation condition, when the apparatus used in the process is designated in addition to the designation of the process of predicting the server load, the processor calculates the number of the servers required to satisfy the apparatus requirement specification of the apparatus based on the apparatus designated under the calculation condition and calculates the server load on the server after determining the server connected to the apparatus in the simulation.

5. The server load prediction system according to claim 1, wherein under the calculation condition, when the server specification and the number of the servers connected to the apparatus used in the process are designated in addition to the designation of the process of predicting the server load, the processor calculates the server load on the server after determining the apparatus connected to the server based on the server specification and the number of the servers designated under the calculation condition in a range in which the server load does not exceed a capability of the server in the simulation.

6. The server load prediction system according to claim 1, wherein in the apparatus requirement specification, information indicating an analysis model used by the server to process information acquired by the one or more information acquisition devices, wherein the information indicating an analysis model is included in the work information; and a load applied to the server, which is caused by the analysis using the analysis model, is indicated in the server load information.

7. The server load prediction system according to claim 1, wherein the apparatus requirement specification includes the server load information based on data measured during an operation of each apparatus or the work information.

8. The server load prediction system according to claim 1, wherein the processor is further configured to determine whether or not the server load calculated by the processor satisfies a determination condition, wherein the determination condition is set with respect to the server load under the calculation condition, wherein when the processor determines that the calculation result of the server load does not satisfy the determination condition, the input information creation unit changes the input parameter, and the processor repeats processing of recalculating the server load based on the changed input parameter, and when the processor determines that the calculation result of the server load satisfies the determination condition, the display screen outputs the calculation result of the server load.

9. The server load prediction system according to claim 8, wherein in the changing of the input parameter, with respect to the apparatus and the server between which a connection relationship is assumed when the server load determined not to satisfy the determination condition is calculated, at least any one of information included in the apparatus requirement specification corresponding to the apparatus or information included in the server specification corresponding to the server is changed.

10. The server load prediction system according to claim 9, wherein the display screen outputs the server load determined to satisfy the determination condition, and the changed information included in the apparatus requirement specification or the changed information included in the server specification.

11. The server load prediction system according to claim 1, wherein when the apparatus requirement specification is changed in the production process, the server load prediction system performs statistical processing on the change in the apparatus requirement specification, wherein numerical values obtained from the statistical processing are stored in the memory, and the processor calculates the server load by using the numerical values stored in the memory.

12. The server load prediction system according to claim 11, wherein when at least some of the apparatuses and the servers are connected with each other by a wireless communication between one or more wireless devices in the production process, the processor calculates a change in a communication volume generated by the wireless communication, and a change of the server load based on the change in the communication volume.

13. The server load prediction system according to claim 1, wherein under the calculation condition, when a capability allowed to the server at the time of the operation is designated, the display screen outputs the server load calculated by the processor in a state in which an excess or a shortage of the capability, which is allowed to the server at the time of the operation and designated under the calculation condition, is capable of being determined.

14. The server load prediction system according to claim 1, wherein the display screen outputs the server load calculated by the processor and a connection relationship between the apparatus and the server, which is assumed in the calculation of the server load.

15. A server load prediction method by a system that predicts a server load on one or more servers connected to one or more apparatuses installed in a production process, the method comprising:
- configuring one or more information acquisition devices to acquire information about the production process and transmit the information to the one or more servers;
- storing:
  - an apparatus requirement specification regarding each apparatus based on information received from the one or more information acquisition devices, the apparatus requirement specification including a server load information and a work information, wherein the server load information indicates a load applied to a server of a connection destination for a control of an apparatus or processing of information transmitted from the apparatus, and wherein the work information indicates information on a predetermined work performed by the apparatus, and
  - a server specification indicating a capability held by each server of the one or more servers is stored based on information received from the one or more information acquisition devices;
- receiving an input of a calculation condition including a designation of a process of predicting the server load;
- generating an input parameter required to execute a simulation for calculating the server load based on the calculation condition, the apparatus requirement specification, and the server specification;
- calculating the server load applied to the server of the connection destination, which is caused by the apparatus used in the process designated under the calculation condition, by executing the simulation based on the input parameter; and
- outputting a calculation result obtained by the calculating of the server load.

* * * * *